(12) United States Patent
Bongartz

(10) Patent No.: US 12,251,859 B2
(45) Date of Patent: Mar. 18, 2025

(54) MODULAR MOUNTING PRESS SYSTEM

(71) Applicant: ATM Qness GmbH, Mammelzen (DE)

(72) Inventor: Jochen Bongartz, Limbach (DE)

(73) Assignee: ATM Qness GmbH, Mammelzen (DE)

( * ) Notice: Subject to any disclaimer, the term of this patent is extended or adjusted under 35 U.S.C. 154(b) by 0 days.

(21) Appl. No.: 18/313,398

(22) Filed: May 8, 2023

(65) Prior Publication Data

US 2023/0339151 A1 Oct. 26, 2023

Related U.S. Application Data

(62) Division of application No. 16/610,686, filed as application No. PCT/EP2018/056037 on Mar. 12, 2018, now Pat. No. 11,685,084.

(30) Foreign Application Priority Data

May 5, 2017 (DE) .......................... 102017109677.9

(51) Int. Cl.
*B29C 43/56* (2006.01)
*B29C 43/36* (2006.01)
(Continued)

(52) U.S. Cl.
CPC .............. *B29C 43/56* (2013.01); *B29C 43/36* (2013.01); *G01N 1/286* (2013.01); *G01N 1/34* (2013.01);
(Continued)

(58) Field of Classification Search
None
See application file for complete search history.

(56) References Cited

U.S. PATENT DOCUMENTS 4,473,215 A * 9/1984 Rathfon, II ............. B30B 15/26
264/40.5
4,969,505 A 11/1990 Sanders
(Continued)

FOREIGN PATENT DOCUMENTS

| CA | 2404629 A1 | 8/2001 |
|---|---|---|
| CN | 2723186 Y | 9/2005 |

(Continued)

OTHER PUBLICATIONS

ATM "Device Catalog", Internet Citation, Mar. 1, 2017, pp. 1-164, XP009505896, URL:http://www.metalco.cz/user/related_files/katalog_atm-3.pdf.

(Continued)

*Primary Examiner* — Jacob T Minskey
*Assistant Examiner* — Adrien J Bernard
(74) *Attorney, Agent, or Firm* — Reising Ethington P.C.

(57) ABSTRACT

The invention relates to a mounting press for hot mounting a sample, comprising: a mounting cylinder which receives the sample and has a main cylinder axis and a cylinder opening, wherein the main cylinder axis extends inside the mounting cylinder and out through the cylinder opening, and a covering that extends around the cylinder opening, and a suction device for extracting granular material dust, granular material, or vapors, for example, wherein the suction device comprises a vacuum generator for providing a suction effect, and wherein the suction device is at least partly mounted on the covering or embedded in the covering.

17 Claims, 23 Drawing Sheets

(51) Int. Cl.
*G01N 1/28* (2006.01)
*G01N 1/34* (2006.01)
*G01N 1/36* (2006.01)

(52) U.S. Cl.
CPC .......... *G01N 1/36* (2013.01); *B29C 2043/561* (2013.01); *B29C 2043/565* (2013.01)

(56) References Cited

U.S. PATENT DOCUMENTS

| | | | |
|---|---|---|---|
| 5,249,947 A * | 10/1993 | Inaba | B29C 45/78 425/150 |
| 5,800,667 A | 9/1998 | Kosaki et al. | |
| 6,854,964 B1 | 2/2005 | Benkofske et al. | |
| 8,141,731 B2 | 3/2012 | Mazurkiewicz et al. | |
| 8,943,949 B2 | 2/2015 | Thoms et al. | |
| 9,186,827 B2 * | 11/2015 | Sunaga | B29C 43/36 |
| 10,170,346 B2 | 1/2019 | Onishi et al. | |
| 10,226,150 B2 | 3/2019 | Poggioli et al. | |
| 2007/0090554 A1 | 4/2007 | Wykoff et al. | |
| 2013/0174925 A1 | 7/2013 | Bahna et al. | |
| 2015/0143928 A1 | 5/2015 | Freson et al. | |
| 2016/0151946 A1 | 6/2016 | Taka et al. | |

FOREIGN PATENT DOCUMENTS

| | | | |
|---|---|---|---|
| CN | 102046485 A | 5/2011 | |
| CN | 103498823 A | 1/2014 | |
| CN | 105223063 A | 1/2016 | |
| CN | 106102527 A | 11/2016 | |
| EP | 3072660 A1 | 9/2016 | |
| JP | S59135896 U | 9/1984 | |
| JP | 2001314940 A | 11/2001 | |
| JP | 2007159309 A | 6/2007 | |
| JP | 2011161776 A | 8/2011 | |
| JP | 2012160676 A | 8/2012 | |
| JP | 2016045044 A | 4/2016 | |
| JP | 2016181548 A | 10/2016 | |
| TW | 201545830 A | 12/2015 | |
| WO | WO2016182438 A1 | 11/2016 | |

OTHER PUBLICATIONS

PCT Partial Search Report for PCT/EP2018/056037, Jun. 25, 2018, 15 pages.
Written Opinion & International Search Report for PCT/EP2018/056038, Jun. 28, 2018, 10 pages.
Written Opinion & International Search Report for PCT/EP2018/056037, Oct. 9, 2018, 13 pages.
PCT Preliminary Report Patentability for PCT/EP2018/056037, Nov. 14, 2019, 9 pages.
PCT Preliminary Report Patentability for PCT/EP2018/056038, Nov. 14, 2019, 8 pages.
JP Office Action for JP Application No. 2019-560138, Oct. 28, 2020, 12 pages.
JP Office Action for JP Application No. 2019-560305, Dec. 23, 2020, 8 pages.
CN Office Action for CN Application No. 201880029822.9, Aug. 26, 2021, 25 pages.
CN Office Action for CN Application No. 201880029853.4, Sep. 16, 2021, 17 pages.
U.S. Office Action for U.S. Appl. No. 16/610,686, filed Jun. 10, 2022, 15 pages.
JP Office Action for JP Application No. 2021-164695, Aug. 10, 2022, 12 pages.
JP Office Action for JP Application No. 2021-164695, Feb. 1, 2023, 12 pages.
EP Extended Search Report for EP Application No. 24179899.0, dated Sep. 9, 2024, (8 pages) in German language.
English Translation of EP Extended Search Report for EP Application No. 24179899.0, dated Sep. 9, 2024, (7 pages).

* cited by examiner

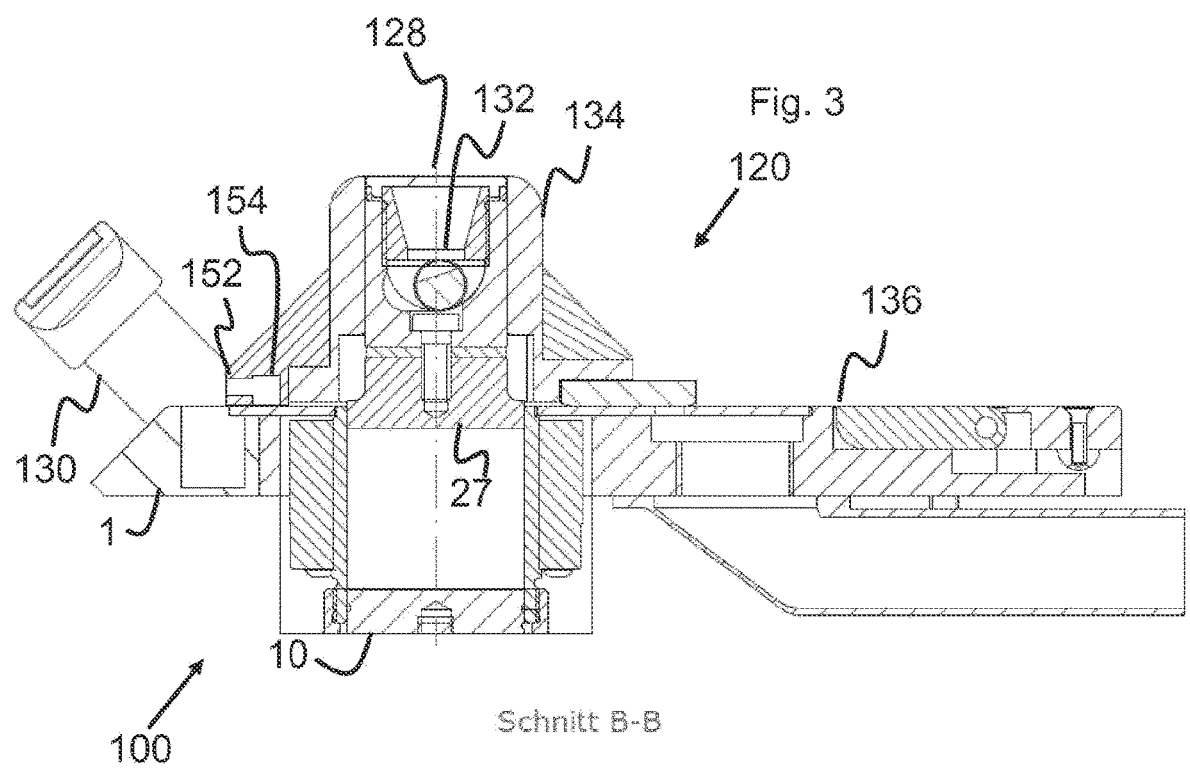
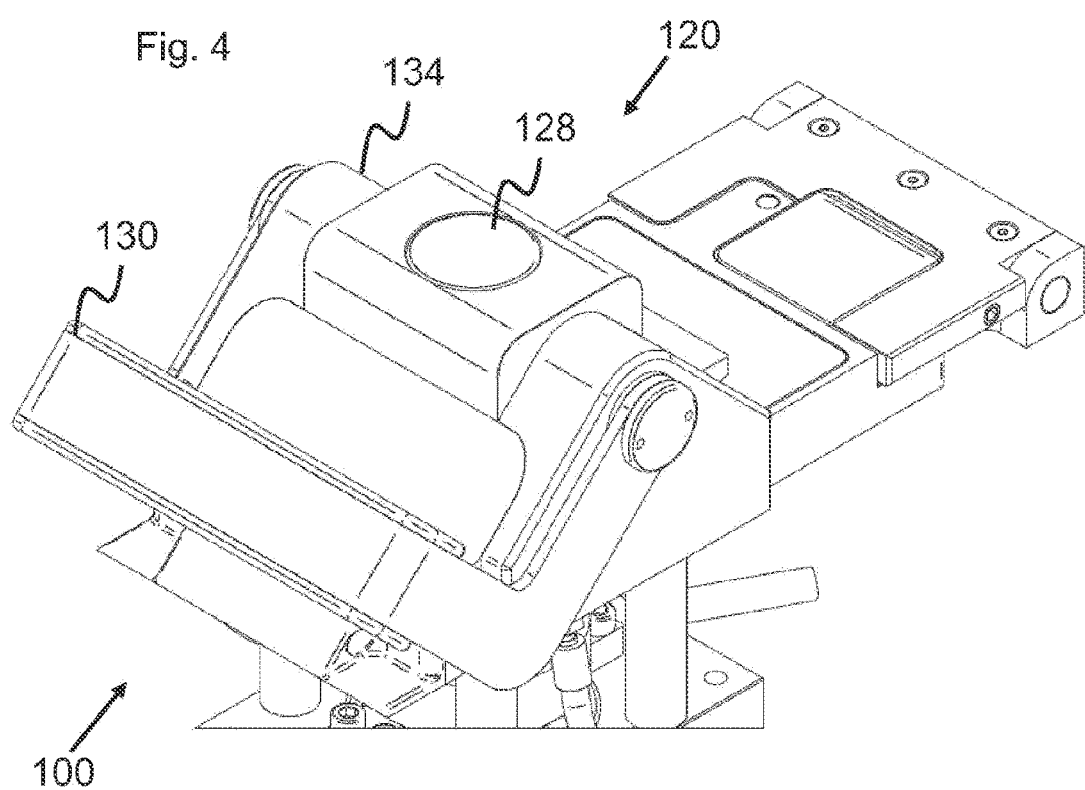

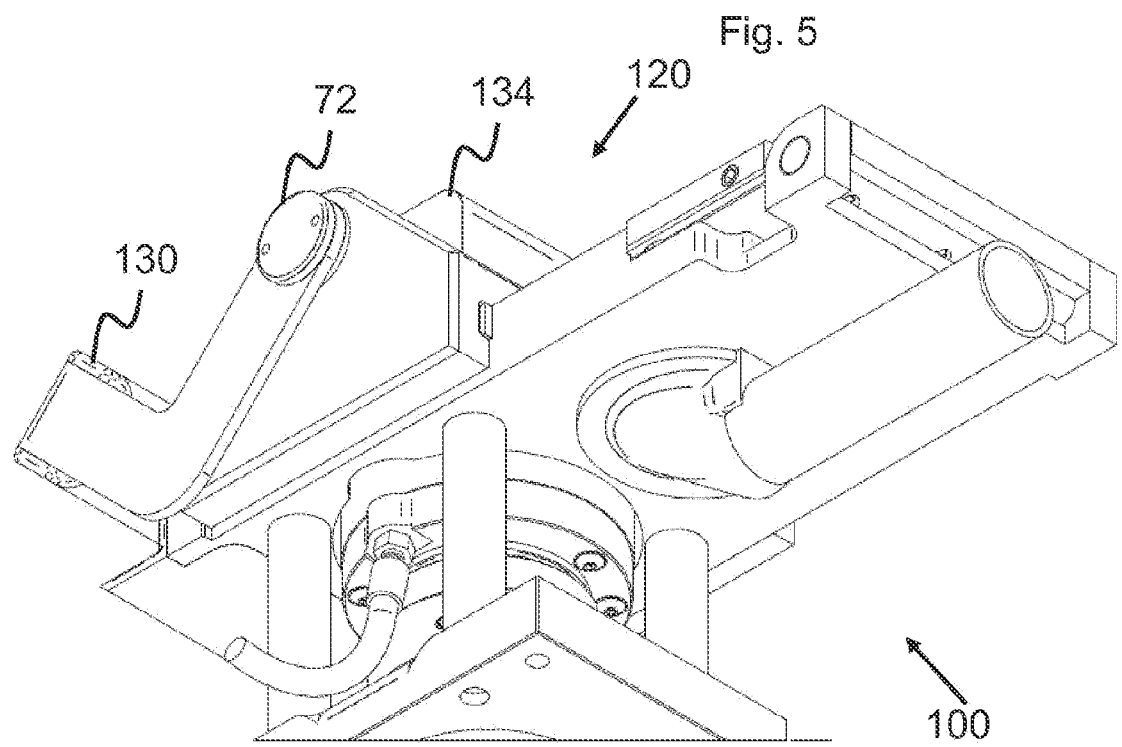
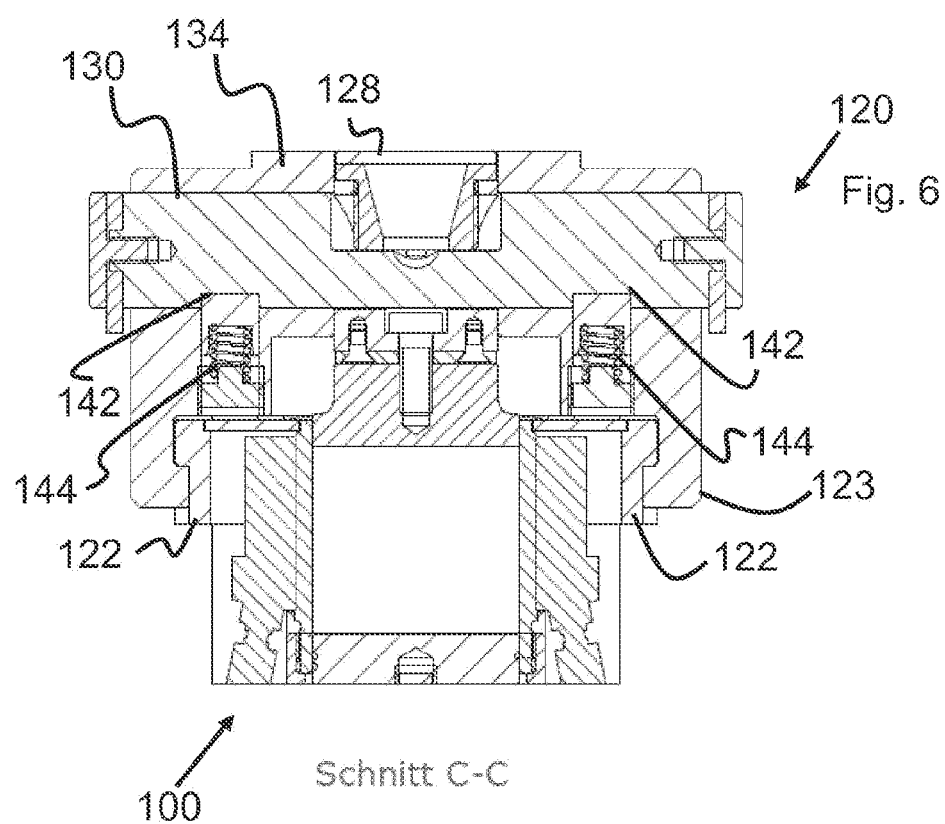

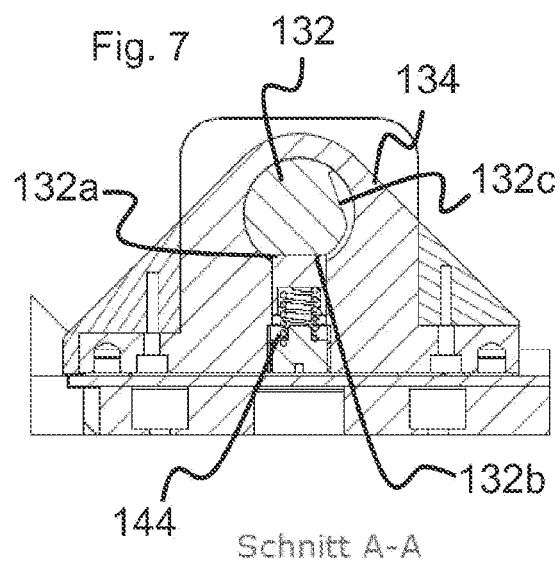
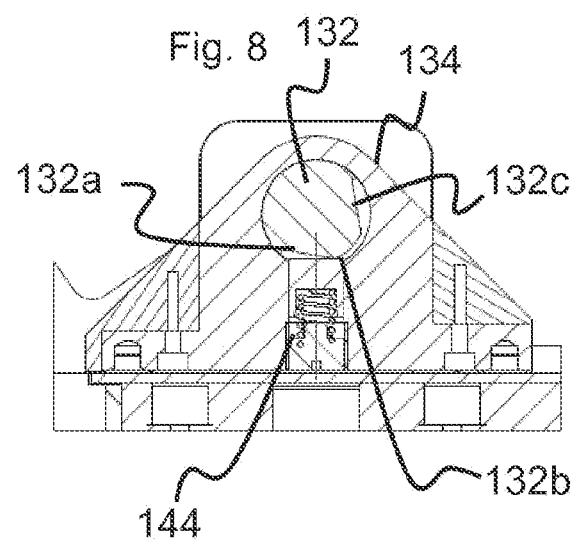
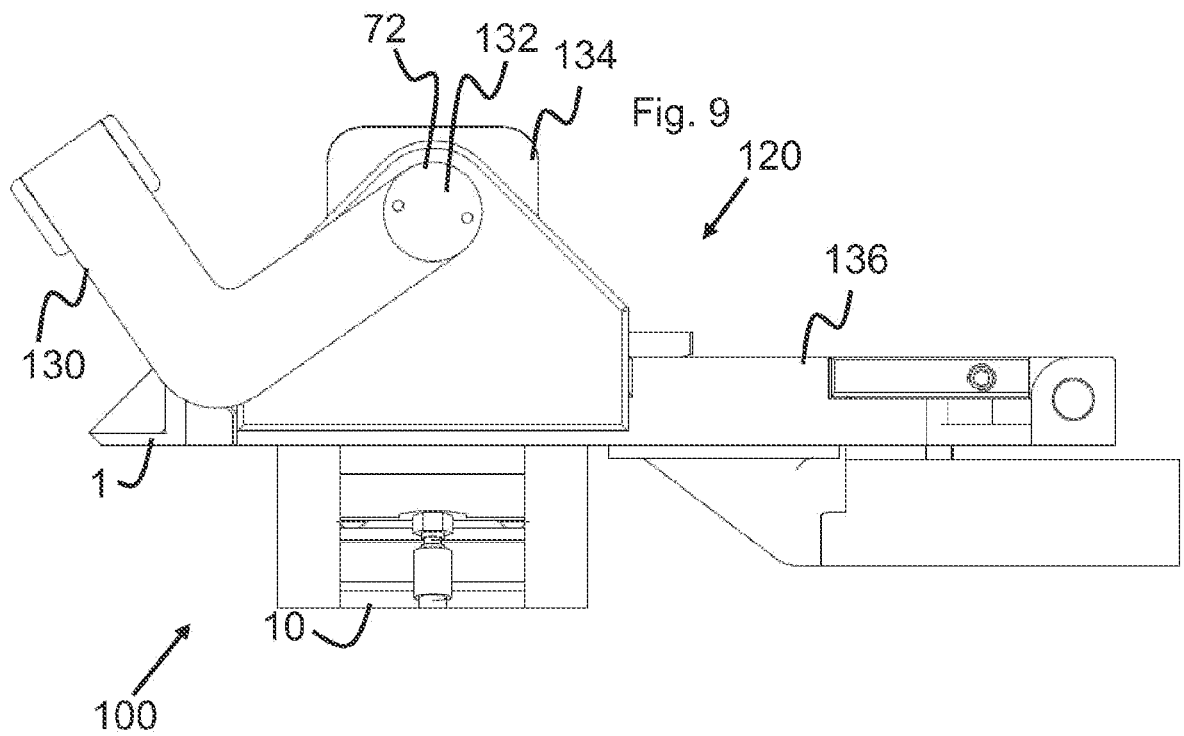

Schnitt F-F

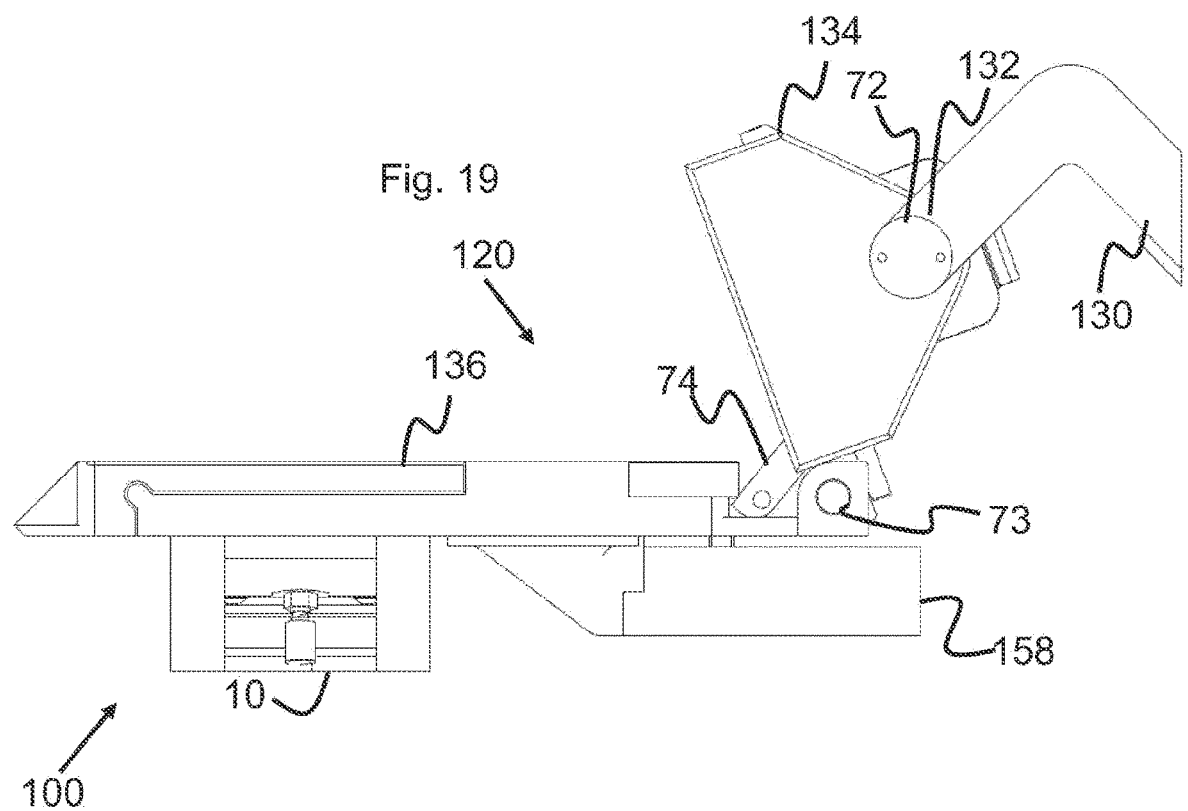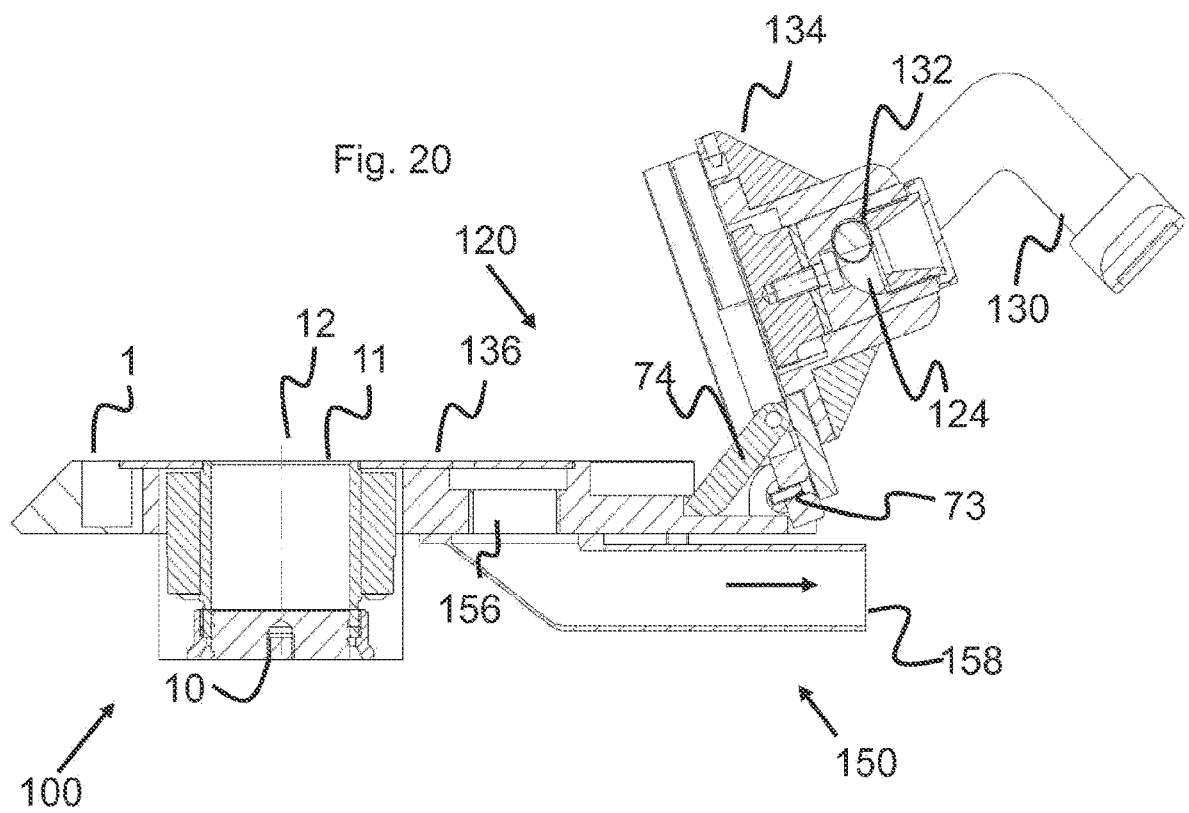

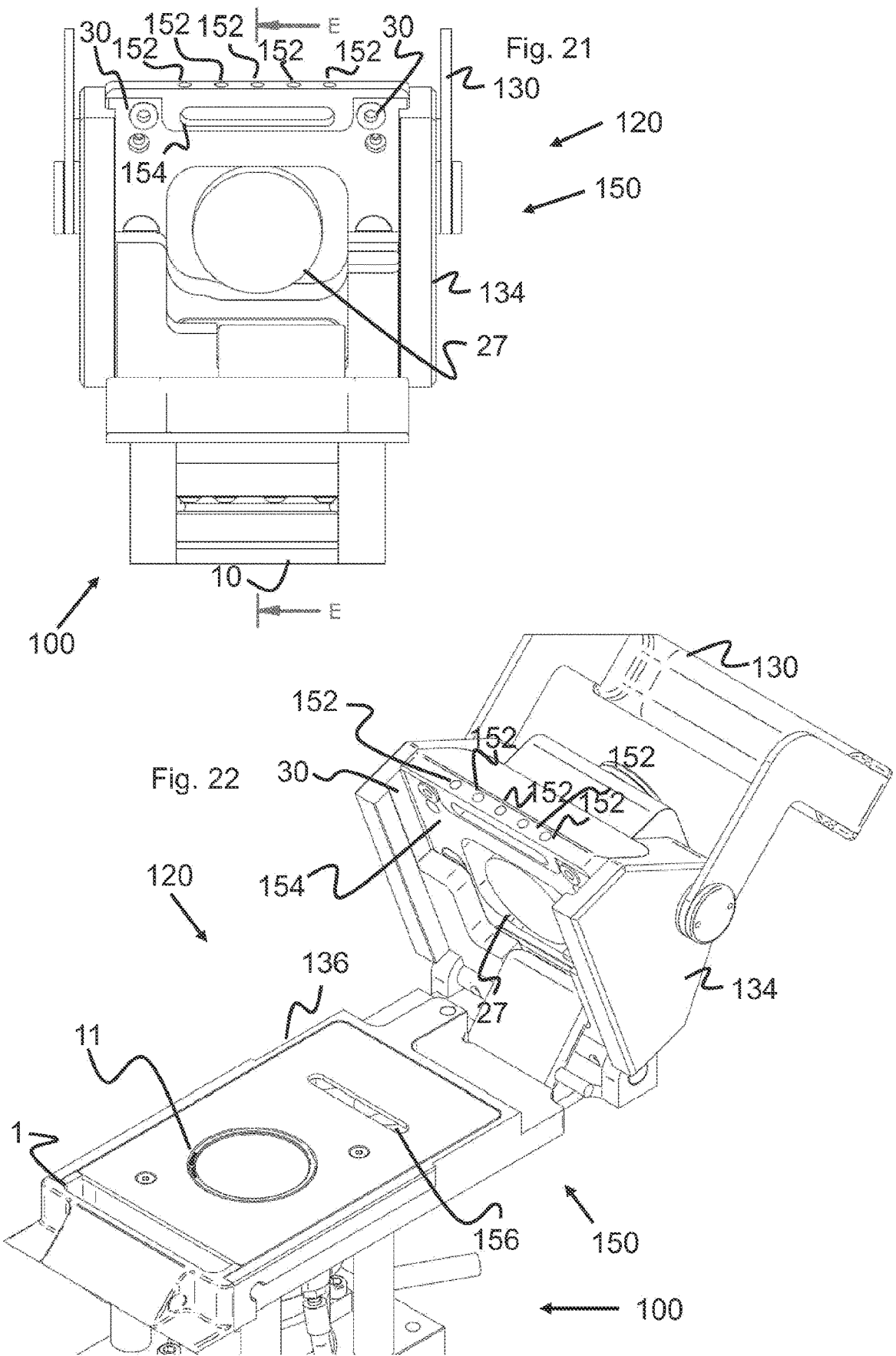

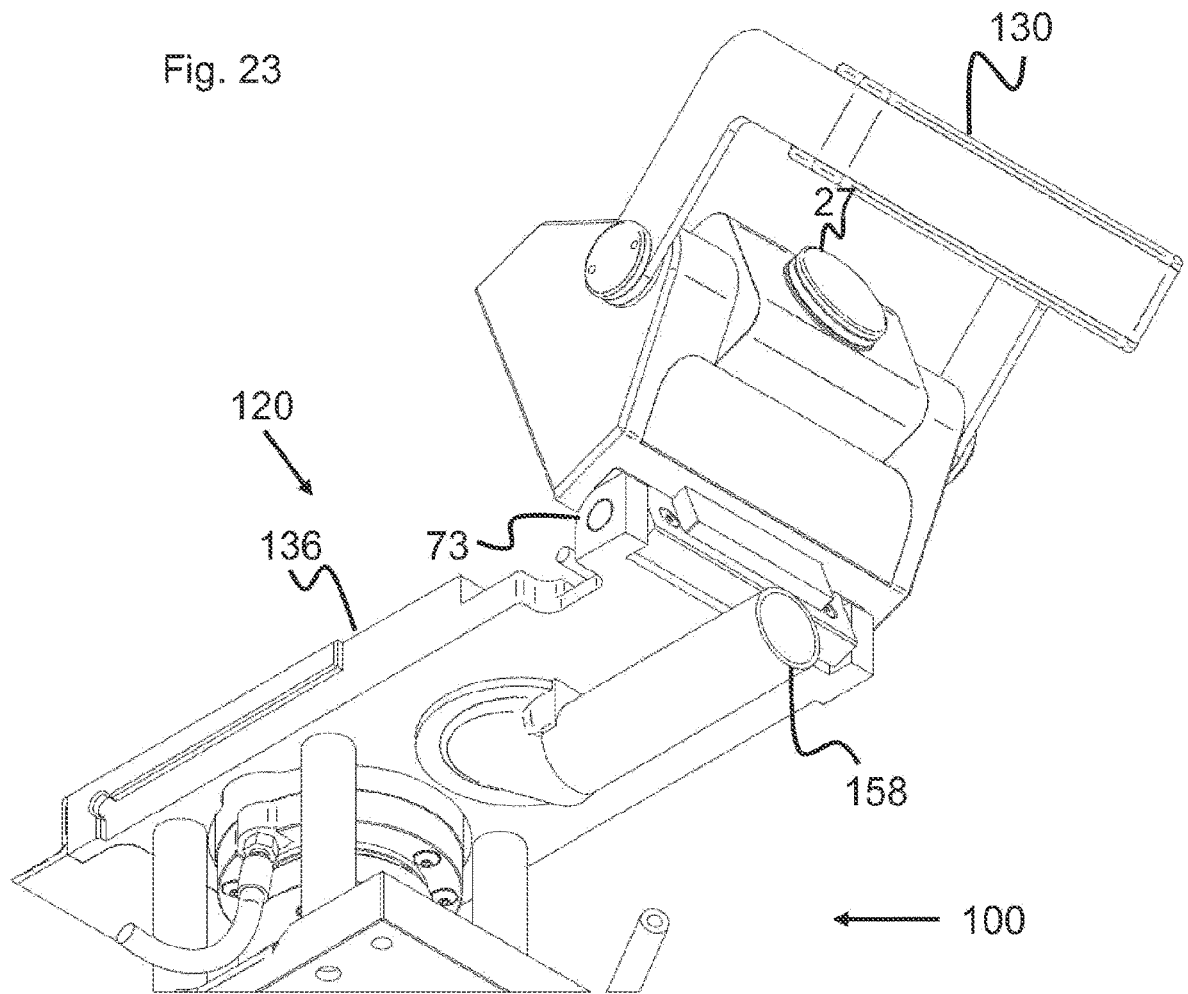

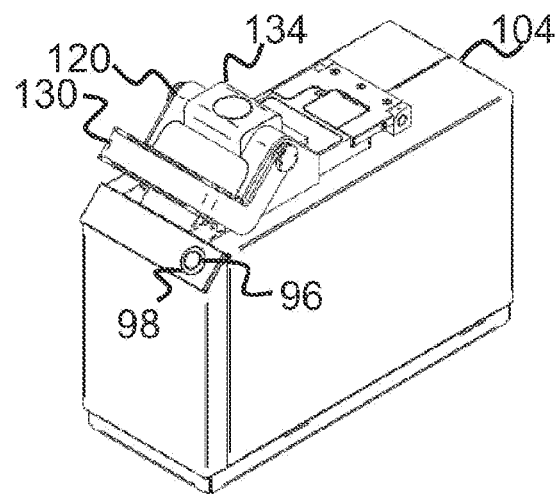
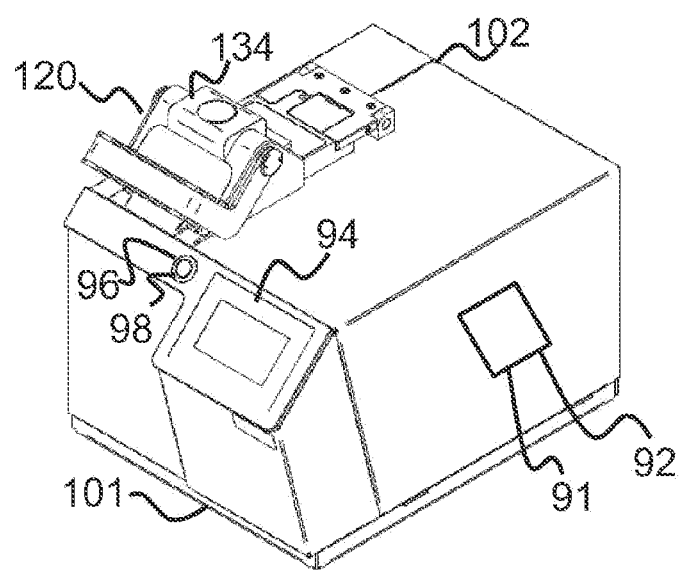

MODULAR MOUNTING PRESS SYSTEM

REFERENCE TO CO-PENDING APPLICATIONS

This application is a divisional of U.S. patent application Ser. No. 16/610,686 filed Nov. 4, 2019, which is a national phase of PCT/EP2018/056037 filed Mar. 12, 2018 and claims the priority of German patent application No. DE102017109677.9, filed on May 5, 2017. The entire contents of these priority applications are incorporated herein by reference.

TECHNICAL FIELD

The present disclosure relates to a mounting press with a suction device, to a suction device for mounting presses, and to a modular mounting press system.

BACKGROUND

Mounting presses, for example for hot mounting samples are known per se, they are widely used in metallographic or materialographic analysis for the preparation of workpieces for characterizing microstructures of, for example, metallic materials by microscopic methods. However, mounting presses are also used for the preparation of analyses of composite materials or ceramic materials, for preparing a sample or workpiece by means of which, for example, a microreaction can be prepared and being examined by light or electron microscopy.

The hot mounting is basically intended to allow for a better handling of the samples and for supporting the edge zone or for infiltration of cracks, pores, or corrosion coatings. Mounting aids may be used for this purpose to fix samples, for example in an upright position.

Due to the steadily increasing interest in materialographic analysis of materials, for example for the investigation of material failure or, more generally for quality control, and for extending the range of applications of mounting presses from pure metallography to materialography and the associated increase in the sample volume and the more intensive use of mounting presses, there is a continuing interest in improving mounting presses technically, for example with regard to user ergonomics. Also, work safety when using a mounting press is subject to constant improvement in order to avoid dangerous or health-impairing impacts.

SUMMARY

Given this background, the present disclosure sets forth a mounting press for mounting a sample, for example for hot mounting a sample, which provides for a more comfortable use of the mounting press and eliminates annoying or even harmful dusts and/or vapors from the mounting press. This makes the work easier for the user and increases work safety for the user. It is inexpensive, reliable, and durable.

Another aspect of the present disclosure is to provide an integrated or integrable suction device which may, for example, also be suitable for being retrofitted to existing mounting presses.

Yet another aspect of the present disclosure is to provide a modular mounting press system for mounting samples, for example for hot mounting samples simultaneously, which provides for more comfortable operation of the mounting press. By way of example, the present disclosure may make the handling and operation easier for the user and also to enhance work safety. Also, it is cost-effective, reliable, and durable, due to the bundling and rationalization as to expensive components.

The present disclosure is described by the subject matter of the independent claims. Additional embodiments of the invention are defined in the dependent claims.

The present disclosure relates to a mounting press for hot mounting a sample in embedding material, typically in granular material. One or more samples can be processed simultaneously in the mounting press.

The mounting press according to the present disclosure comprises a mounting cylinder or pressing cylinder for receiving the sample. The mounting cylinder has a main cylinder axis and a cylinder opening, with the main cylinder axis extending inside the mounting cylinder and out of the cylinder opening.

Furthermore, the mounting press comprises a covering extending around the cylinder opening. The covering may be a plane or flat surface which, for example, has a horizontal main extension direction. The cylinder opening may be recessed in the covering. Preferably, the covering constitutes a carriage support with laterally disposed carriage seats such as a sliding guide for receiving a sliding closure.

The mounting press according to the present disclosure comprises a suction device for extracting granular material dust, granular material, or vapors, for example, especially from the region around the cylinder opening. For example, the suction device is completely incorporated or integrated in the mounting press. The suction device comprises a vacuum generator for providing a suction effect and is at least partly mounted on the covering or embedded in the covering or connected to the covering.

The covering is preferably a covering plate with the cylinder opening recessed therein. The covering may also have a carriage guide for a sliding carriage.

In this case, the suction device may be integrated in the sliding carriage, at least partially. The extracted granular material dust and/or extracted vapors can preferably be passed through the sliding carriage in such a preferred embodiment.

In a further embodiment, the suction device may comprise suction openings recessed in the covering plate, which are arranged around the cylinder opening recessed in the covering plate.

A vacuum generator may be arranged on the mounting press for providing the suction effect.

In a further embodiment, a front side granular material compartment may be provided for receiving granular material. For example, excess granular material which has been introduced into the mounting cylinder in excess of the desired or maximum filling level of the mounting cylinder may be received therein. This may include residues that are not fitting through the suction opening. Preferably, the residues of granular material are conveyed into the granular material compartment by sliding the sliding carriage to and onto the cylinder opening prior to starting or using the mounting press. During the sliding operation, the granular material residues are gathered by the front face of the sliding carriage and pushed over the covering and into the granular material compartment.

In one embodiment of a suction device for a mounting press, in which the mounting press has a mounting cylinder or pressing cylinder, a cylinder opening and a main cylinder axis extending through the mounting cylinder, a covering may be provided extending around the cylinder opening, and a vacuum generator to provide a suction effect. The vacuum generator is for example a fan device.

Furthermore, the suction device has at least one suction air passage connected to the vacuum generator. The extracted air together with the extracted dust, granular material or vapors is discharged through the suction air passage towards the vacuum generator.

The suction device comprises at least one suction opening that is in communication with the suction air passage, which may be arranged adjacent to the cylinder opening such that a suction effect can be achieved in the region of the cylinder opening. Moreover, the suction device may be at least partly mounted on the covering or embedded in the covering.

In a further example, the suction device may be adapted to unfold the suction effect directly in the region of the cylinder opening of the mounting cylinder. For this purpose, the at least one suction opening may be recessed in the covering laterally spaced apart from the cylinder opening. The at least one suction opening may as well be recessed or provided in the covering concentrically around the cylinder opening.

The covering is preferably a covering plate and has a carriage guide for a sliding carriage.

In a suction device comprising a sliding carriage that can be moved transversely to the cylinder axis, for example in a carriage guide of the covering plate, the at least one or a further suction opening may be provided on the sliding carriage. For example, the suction opening is arranged on a front side of the sliding carriage, so that the suction device achieves an effect directed directly towards the region of the cylinder opening when the sliding carriage is in a suction position in which the cylinder opening is not covered by the sliding carriage.

The at least one suction opening may be connected to the suction air passage through the sliding carriage. For example, the sliding carriage then comprises at least one sliding carriage passage which connects the at least one suction opening to the suction air passage by extending through the sliding carriage. Optionally, it is possible for the sliding carriage to additionally have a suction position in which the at least one suction air opening is in communication with the vacuum device through the sliding carriage so as to be exposed to an extracting negative pressure thereby.

The sliding carriage may have a position of use in which the sliding carriage covers the cylinder opening, i.e. is flush with the cylinder opening so as to preferably completely cover it.

The suction device may provide for vapor extraction so as to suck off vapors that are generated during the pressing operation of the mounting press. In this case, the sliding carriage may be adapted so that the suction effect unfolds in the region of the cylinder opening when the sliding carriage is in the position of use. For this purpose, the sliding carriage may have sliding carriage passages which are in communication with the suction air passage of the suction device in the position of use of the sliding carriage.

At least part of the suction air passage may be embedded in the covering plate so that the suction air passage extends through the covering plate and/or at least partly extends through the covering plate.

In a further example, the suction device may furthermore comprise a filter element which is preferably arranged at the vacuum generator. Such a filter element allows to filter granulate material dusts, granular material or possibly vapors from the extracted air. Depending on the configuration of the suction device, the filter element may optionally be selected with regard to the filter effect, the mesh size of the filter.

In one example, the suction device may furthermore comprise at least one further mounting press with a further cylinder opening, in which case the vacuum generator is a shared vacuum generator. In this example, the suction device is adapted to unfold the suction effect directly in the region of the cylinder opening of the mounting cylinder and at the same time at the further cylinder opening of the at least one further mounting press.

In an extended exemplary embodiment, the mounting press with extraction device may also comprise a sliding closure.

For this purpose, the mounting press comprises a mounting cylinder or pressing cylinder for receiving the sample. The mounting cylinder has a main cylinder axis and a cylinder opening, with the main cylinder axis extending inside the mounting cylinder and out of the cylinder opening.

The mounting press furthermore preferably comprises the sliding closure with a sliding carriage, an upper piston and a closing lever operatively connected to the upper piston. The sliding carriage is configured so as to be displaceable in a direction transverse, for example perpendicular, relative to the main cylinder axis, it is preferably displaced using the closing lever. In other words, the closing lever is designed to be manually actuated so that the sliding carriage of the sliding closure can be easily displaced in a direction transverse relative to the main cylinder axis when gripping the closing lever. In this way, the sliding carriage can be brought into a position of use of the sliding carriage, in which the upper piston can be driven to or into the cylinder opening of the mounting cylinder.

In this case, the closing lever may have at least one open position and one closed position and can be transferred from the open position into the closed position, for example manually. In a preferred embodiment, the transferring of the closing lever from the open position to the closed position and back is only possible in the position of use of the carriage. In this case, a detent or closing lever lock may be provided to block the closing lever when the sliding carriage occupies a position other than the position of use. The sliding carriage can then be moved freely by means of the closing lever, for example along a carriage support, however, the closing lever will preferably be blocked from being transferred from the open position to the closed position and only released when the sliding carriage is in the position of use. The closing lever may as well be configured so as to be in a detent position in a way so that the detent is overcome by the tensile force applied on the closing lever of the sliding carriage by a hand to be transferred from the open position to the closed position.

The closing lever cooperates with the upper piston such that the upper piston closes the cylinder opening when the closing lever is transferred from the open position to the closed position when the sliding carriage is in the position of use. The upper piston closes the cylinder opening for example in a force absorbing manner or with over-center locking, while allowing gases and vapors that may arise in the sample or during the preparation of the sample to escape. In other words, the closing lever allows to easily put the mounting press into operational readiness by moving the sliding carriage into the position of use and moving the closing lever into the closed position.

The main cylinder axis of the cylinder is preferably the cylinder's central axis, i.e. the axis extending centrally through the cylinder along the mathematical height extension. In the position of use of the sliding carriage, the main cylinder axis then preferably extends centrally through the upper piston. In other words, in the position of use, the upper piston is or can be aligned with the cylinder opening of the mounting cylinder by means of the sliding carriage.

The mounting press preferably comprises a carriage support. In a first embodiment, the carriage support is a flat or planar surface along or on which the sliding carriage is displaceable. The cylinder opening is preferably recessed in the carriage support. That is, the carriage support surrounds the cylinder opening all around, preferably in a plane which also includes an exit surface of the cylinder opening. In other words, the exit surface of the cylinder opening and the carriage support define a common plane. Thus, the carriage support is preferably arranged transversely to the cylinder axis in its main extension direction, for example it is arranged perpendicular thereto.

Furthermore, the sliding closure is preferably displaceable along the carriage support and can be positioned over the cylinder opening.

The present disclosure furthermore relates to a sliding closure for a mounting press that comprises a mounting cylinder having a cylinder opening and a main cylinder axis extending through the mounting cylinder. The sliding closure comprises an upper piston arranged in the sliding closure, and a closing lever operatively connected to the upper piston, and a sliding carriage configured to be displaceable in a direction transverse, for example perpendicular to the main cylinder axis, which is adapted to drive the upper piston to or into the cylinder opening of the mounting cylinder in a position of use of the sliding carriage.

The upper piston has at least one open position and one closed position and can be transferred from the open position to the closed position. Preferably, the upper piston can be transferred from the open position to the closed position in the position of use of the carriage.

The closing lever cooperates with the upper piston such that by moving the closing lever the upper piston is moved from the open position to the closed position and closes the cylinder opening when the sliding carriage is in the position of use. In other words, the closing lever is in an open position when the upper piston is in the open position and is in a closed position when the upper piston is in the closed position.

The closing lever preferably has a closure shaft. The closure shaft defines the bearing or fulcrum of the closing lever, and an application of force such as by manual actuation of the closing lever can be transferred, via the closure shaft, for example to the upper piston, for closing the mounting press.

The upper piston is transferred from the open position to the closed position by a pivotal movement of the closing lever around the closure shaft.

The closure shaft furthermore preferably has an eccentric component. The eccentric component is mounted on the same axis as the closure shaft, for example, and co-rotates with the rotation of the closure shaft. Alternatively, the closure shaft is an eccentric shaft, for example so as to have a cam and thus being a camshaft or, more generally, so as to have a variable cross section over its extension direction. Thus the closure shaft is adapted to transfer the upper piston from the open position to the closed position, directly or indirectly.

Furthermore preferably, the closure shaft is arranged adjacent to the upper piston such that the closure shaft acts directly on the upper piston during the transfer of the upper piston from the open position into the closed position to move it in such a way that it closes the cylinder opening. For example, the closure shaft is arranged directly above the upper piston, and the cam or the eccentric component bears on the upper piston. Upon rotation of the closure shaft and thus rotation of the cam or the eccentric components, a lowering force is exerted on the upper piston in this example, whereby the upper piston is moved into the mounting cylinder when the sliding carriage is in the position of use.

The sliding closure furthermore preferably comprises at least one compressible element, for example a spring element, for providing a retaining force for at least temporarily holding the upper piston in either the open position or the closed position. In other words, the one or more spring element(s) hold the upper piston in the open position, for example, and press it against the cam or against the eccentric component. If the lowering force of the eccentric component or cam to the upper piston exceeds the retaining force of the compressible element, for example caused by actuation of the closing lever, the upper piston is transferred to the closed position, i.e. it is moved into the mounting cylinder by the eccentric component or the cam or the closing lever.

Preferably, the upper piston can take a dead center position between the open position and the closed position, and the upper piston can be reliably held in the respective open position or closed position when the piston is driven to a position beyond the dead center position by means of the closing lever.

The sliding carriage furthermore preferably has a service position in which the cylinder opening is completely cleared, and in the service position the sliding carriage can for example be tilted about a service axis. More preferably, the sliding carriage can be locked in the tilted position.

In a further exemplary embodiment, the sliding carriage comprises a sensor device for detecting the position of the sliding carriage. The sensor device can, for example, be used to detect whether the position of use or the service position has been occupied by the sliding carriage. Furthermore, for example, the position information of the sliding carriage can be output to a controller of the mounting press, and the operation of the mounting press can be controlled in response to the position information, for example only if the sliding carriage and/or the closing lever are in the closed position or the position of use.

In a further exemplary embodiment, the sliding closure comprises a carriage support along which the sliding carriage is displaceable and which has a carriage seat or a sliding guide for receiving and guiding the sliding carriage. In one example, the carriage support is a flat or plane surface having laterally disposed carriage seats such as a sliding guide.

Furthermore, the sliding closure may be equipped with a front side compartment for granular material, and excess granular material is transferred into the granular material compartment for example by the displacement of the sliding carriage into the position of use.

The granular material compartment may be configured so as to be removable, and the granular material compartment for example has a magnetic holder for being attached to the carriage support for easily emptying the excess granular material collected in the granular material compartment.

The present disclosure furthermore relates to a mounting press comprising a sliding closure as described above.

According to yet another aspect of embodiments of the mounting press, a modular mounting press system for hot mounting of samples is described. In a mounting press for hot mounting a sample in embedding material, typically in granular material, one or more samples may be processed simultaneously in the mounting press. The mounting press comprises a mounting cylinder for receiving the sample. The mounting cylinder may have a main cylinder axis and a cylinder opening, wherein the main cylinder axis extends inside the mounting cylinder and out through the cylinder opening.

According to this further embodiment aspect of the mounting press, the modular mounting press system comprises a basic module for controlling at least one external mounting press, and a first external mounting press separate from the basic module and having a first mounting cylinder for receiving samples.

In this case, the basic module comprises a central input device for entering control data for the at least one external mounting press, a central power supply port for connecting the modular mounting press system to an external power supply, and a power distributor for providing the electrical power to the at least one external mounting press.

The modular mounting press system may furthermore comprise a hydraulic distributor for supplying cooling water to the at least one external mounting press.

The basic module may furthermore comprise at least one mounting press connector for electrically connecting the at least one external mounting press to the basic module for transferring both the electrical power required by the at least one external mounting press and control data for controlling the at least one external mounting press.

In another embodiment, the basic module may comprise a basic module mounting press accommodated in a shared basic module housing. In other words, this is an internal mounting press in the basic module housing, which is integrated with the control device of the basic module.

The power distributor may be configured to distribute the electrical power to the basic module mounting press and to the at least one external mounting press while taking into account a prioritization order that can be predetermined by the central controller. In other words, the central controller may define a sequence of allocation of the electrical power to the respective internal or external mounting press, for example by user input or by programming. This makes it possible, for example, to operate the modular mounting press system on a smaller dimensioned electrical power supply and nevertheless put all mounting presses into operation such that time delays are kept as small as possible. In other words, the complete modular mounting press system can thus be operated on a common or standard electrical power grid. For example, the mounting presses typically need the full electrical power only during the heating process, while during the cooling process they only need considerably lower electrical power.

The power distributor of the modular mounting press system may furthermore be configured to distribute the electrical power to the basic module mounting press and to the at least one external mounting press in a clocked manner when a predetermined amount of electrical power is reached or exceeded. In other words, the power distributor may be adapted to distribute the electric power to the mounting presses so as to not exceed a total amount of electric power that is needed from the external power grid. If, for example, the power distributor recognizes, based on the data made available by the central controller, that a heating process of an external mounting press is still continuing but is about to be completed, this heating process as a process A may be assigned a priority A. The desired start of a process B, for example of a further heating process, may then be started by the central controller either with a delay, i.e. a desired heating process as a process B is started only when the process A requires less electrical power and sufficient energy is available for starting the process B. In other words, process B which is controlled in prioritized manner is not started before process A starts to operate in a clocked manner and thus a free clock is available for the process B. In another case, process B may be started immediately and the electrical power can be distributed, by the power distributor, to the processes A and B in such a manner that both processes are optionally operated at reduced power or in a mixed clocked manner. This may be achieved by the clocked distribution of electrical power.

The at least one mounting press connector, the central power supply port, and the hydraulic distributor may all be arranged on a rear side of the basic module, for example.

Furthermore preferably, two or three external mounting presses are connectable to the basic module. All external mounting presses may be controlled and supplied with electrical power by the basic module. The external mounting presses do no longer require a complete process control unit, since all the process control components are accommodated in the basic module. This allows to achieve a significant reduction in system costs. At the same time, ergonomics for the user can be enhanced by enabling to start and manage all processes from a central system. For example, this can come into play when the plurality of mounting presses are intended to carry out the same process in parallel and the user has to manually enter the process parameters only once for the first process, while it can then use the parameters already entered into the central controller for programming the further identical processes. Also, the user can be relieved by only having to take into account one control and operating unit and by getting displayed the operation parameters of all mounting presses of the modular mounting press system at one combined location there.

In a further preferred embodiment, the at least one external mounting press can have an indicator device for indicating the operating state, for example a color-changing indicator device. Such an indicator device may be implemented, for example, by providing a luminous color, for example by a four-color lamp or four LEDs of different color values. For example, operating conditions of an external mounting press to be indicated would be (1) heating mode, for example by red color, (2) ready for receiving or ready state, for example by green color, (3) cooling mode, for example by blue color, and (4) not ready or lid open state, by white color. However, the indicator device may also be used to implement the indication of other and/or further operating states. The decentralized indicator device arranged on the respective mounting press can thus provide the user with a quick first overview of the basic state of any of the mounting presses of the modular mounting press system, while the exact status data and further information continue to be displayed or made available at the central input device on the basic module.

Furthermore preferably, the at least one external mounting press may comprise a decentralized control button. Such a decentralized control button can be used, for example, to select, for the central input device, the mounting press to be displayed, set or programmed. Thus, this is a user-friendly embodiment featuring a combination of central control of the process parameters and decentralized selection of the parameters to be set at the central input device.

Furthermore preferably, the decentralized control button may at the same time comprise the indicator device mentioned above. This may be achieved, for example, by providing an illuminable control button on the respective mounting press, with the color state of the control button representing the operating state of the respective mounting press. This may also be achieved by providing the control button with a luminous ring or color ring around the control button, with the color ring representing the operating state of the respective mounting press based on the presented color. This allows the user to identify, at a glance, the basic operation state of all mounting presses of the modular mounting press system. If the user desires any information about a mounting press or any changes in the operation process of a mounting press, then the respective mounting press can be selected via the control button and the respective process parameters can be entered at the central input device.

The basic module mounting press and/or the at least one external mounting press may comprise a sliding closure.

The modular mounting press system may furthermore be equipped with a central suction device including a suction manifold for connecting the basic module mounting press and the at least one external mounting press to the central suction device.

It will be apparent to a person skilled in the art that although the present disclosure is applicable to mounting presses, it can in principle also be used for other machines. The latter shall not be excluded.

The present disclosure will now be explained in more detail by way of exemplary embodiments and with reference to the figures in which the same and similar elements are partially designated by the same reference numerals, while the features of the various exemplary embodiments can be combined.

BRIEF DESCRIPTION OF THE FIGURES

In the figures

FIG. 3 is a sectional side view of a mounting press with the closing lever closed;

FIG. 4 is a perspective top view of a mounting press with the closing lever closed;

FIG. 5 is another perspective view of a mounting press with the closing lever closed;

FIG. 6 is another sectional view of a mounting press with the closing lever closed;

FIG. 7 is yet another sectional view of a mounting press with the closing lever closed;

FIG. 8 is a sectional view of a mounting press with the closing lever in a turning point position;

FIG. 9 is a schematic side elevational view of a mounting press with the closing lever in the turning point position;

FIG. 19 is a schematic side view of a mounting press with sliding carriage in service position;

FIG. 20 is a sectional side view of a mounting press with sliding carriage in service position;

FIG. 21 is a schematic front elevational view of a mounting press with the sliding carriage in service position;

FIG. 22 is a perspective view of a mounting press with the sliding carriage in service position;

FIG. 23 is another perspective view of a mounting press with sliding carriage in service position;

FIG. 30 shows an external mounting press of a modular mounting press system;

FIG. 31 shows a basic module of a modular mounting press system;

DETAILED DESCRIPTION

Figure 1:
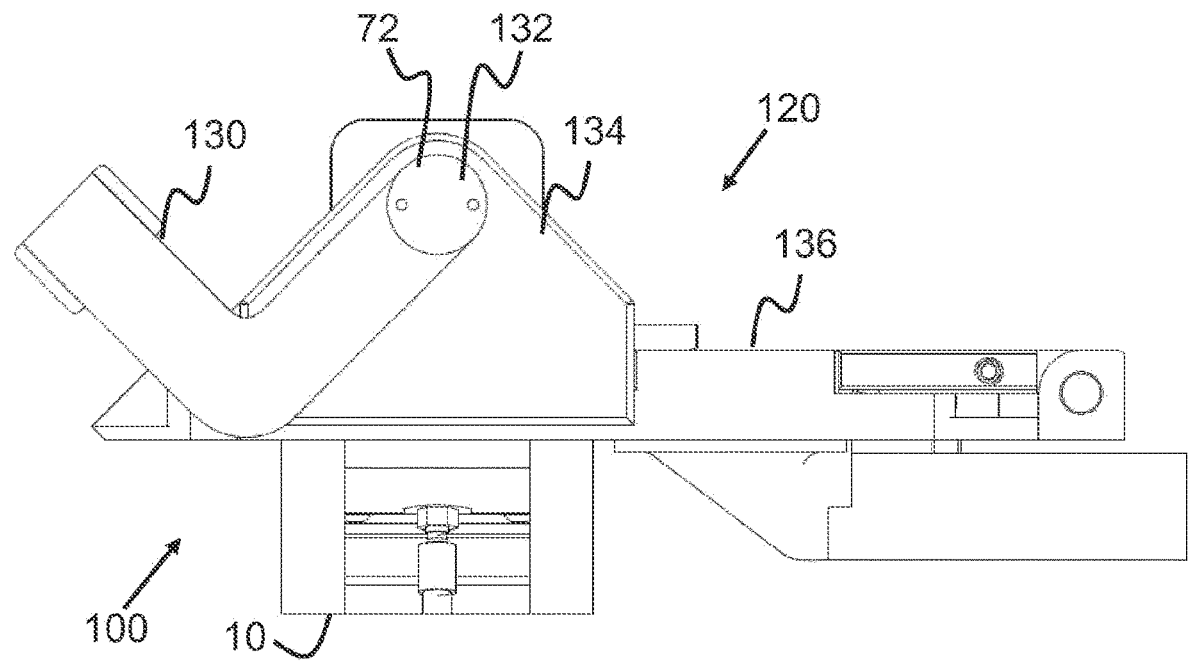
FIG. 1 is a schematic side elevational view of a mounting press with closed closing lever.

Referring to FIG. 1 which shows a first side elevational view of a sliding closure device 120 of a mounting press 100 according to the present disclosure, with closed closing lever 130. The closing lever 130 is mounted on a closure shaft 132 that is arranged on an upper side of the sliding carriage 134. In the present example, closure shaft 132 is covered on the outer surface by a rotary part 72. The sliding carriage 134 can be moved along the carriage support 136 and is arranged in the position of use, so that the mounting cylinder 10 is closed by the sliding closure 120.

Figure 2:
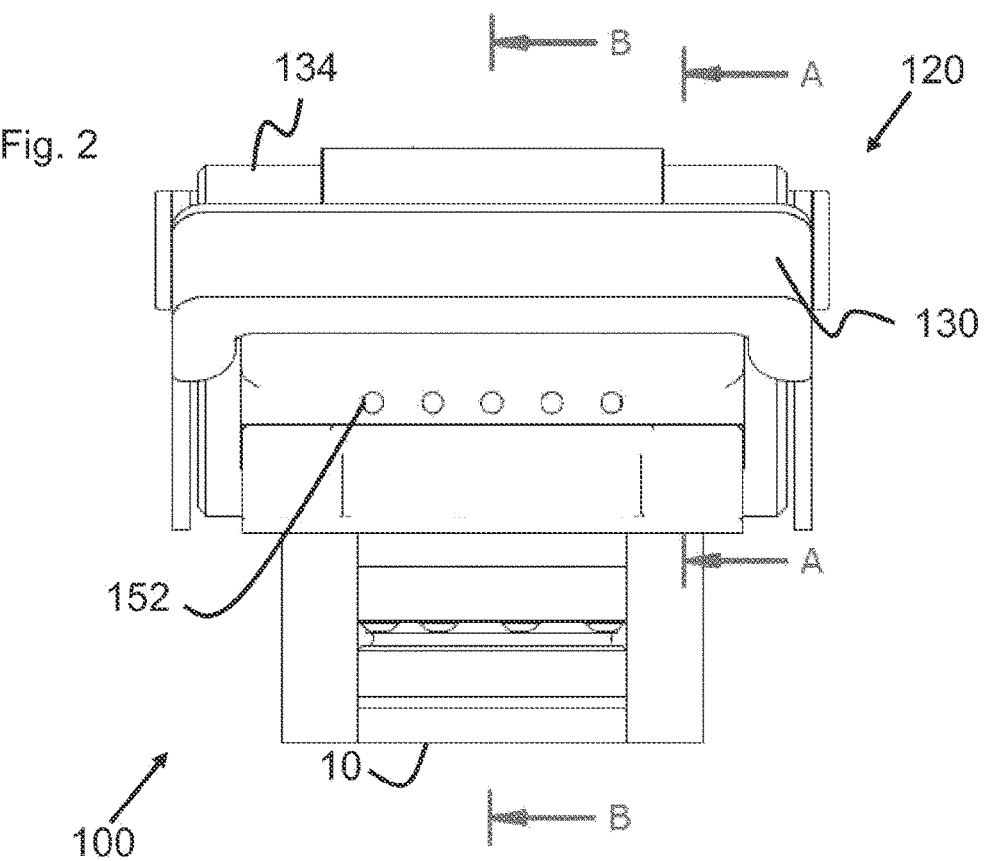
FIG. 2 is a schematic front elevational view of a mounting press.

FIG. 2 shows a front elevational view of the sliding closure device 120 shown in FIG. 1, with the closing lever 130 closed. Section marks B-B and A-A indicate the sectional planes of FIGS. 3 and 7, respectively. Suction openings 152 of the suction device 150 are arranged on the front side of sliding carriage 134, in the present example five suction openings arranged next to each other.

FIG. 3 shows the sectional plane B-B of FIG. 2 with the closure device 120 in the position of use and with the closing lever 130 in the closed position. The upper piston 27 is engaged in the cylinder 10 so that the cylinder opening 12 (cf. FIG. 15, for example) is closed. Closure shaft 132 extends across sliding carriage 134.

On the front side of carriage support 136, a granular material compartment 1 is provided for collecting excess granular material. When the sliding carriage 134 is moved to the position of use, it automatically pushes excess granular material into it.

On the front side of sliding carriage 134, a suction opening 152 is shown, which merges into a sliding carriage passage 154 inside the sliding carriage 134.

FIG. 4 shows a perspective schematic view of the closure device 120 in the closed position of the closing lever 130 as above. In the closed position, the upper piston covering 128 terminates flush with the upper surface of sliding carriage 134. FIG. 5 shows a further perspective schematic view of the closure device 120 holding closed the cylinder 10.

FIG. 6 shows a further sectional view, the section being taken along a plane extending centrally through the upper piston covering 128, closure shaft 132, and cylinder 10 in FIG. 3. Closure shaft 132 has a variable cross section along its extension direction. Closure shaft 132 has recesses 142 in which spring elements 144 are engaging. The spring elements 144 generate a restoring force that holds the upper piston 27 and thus the closing lever 130 either in the closed position or in the open position, similar to a kind of "over-center locking". Furthermore, FIG. 6 shows a carriage guide 122 on both sides of the cylinder 10, guiding the sliding carriage 134 along its direction of displacement (out of the plane of the sheet).

FIG. 7 shows a sectional view along section line A-A indicated in FIG. 2. In this region of its extension, the closure shaft 132 has two flattened areas 132a and 132b. Between them, the closure shaft 132 has a protrusion, that is to say a cam 132c. The flexible element 144 presses against the flattened region 132a, thus creating a retaining force such that the closure shaft 132 is retained in the closed position. By adjusting the spring force or pressing force of the flexible element 144 against the closure shaft 132, it is possible to control or adjust the disengaging force that has to be applied to release the closing lever 130 from the closed position.

Referring to FIG. 8, the closure device 120 remains in the turning point position in which the disengagement force for releasing the closing lever 130 from the closed position has just been applied or the closing lever 130, when guided toward the closed position, is pulled into the closed position by the now increasing retaining force of the flexible element 144. Thus, the movement of the closing lever into the two end positions "open position" and "closed position" is "pulling and detenting". So, a rotation of the closure shaft 132 beyond the dead point results in a chocking of the closure device 120 and hence also of the upper piston 27 which is directly operatively connected to the closure device. When in the closed position of the sliding closure 120 the mounting cylinder 10 is subjected to cylinder pressure, this cylinder pressure will generate an additional retaining force on the engagement of the flexible element 144 with the flattened area 132a, so that finally the sliding closure 120 cannot be opened by hand during operation of the mounting press 100. Furthermore, FIG. 9 shows a side elevational view of the closure device 120 in the turning point position.

Figure 10:
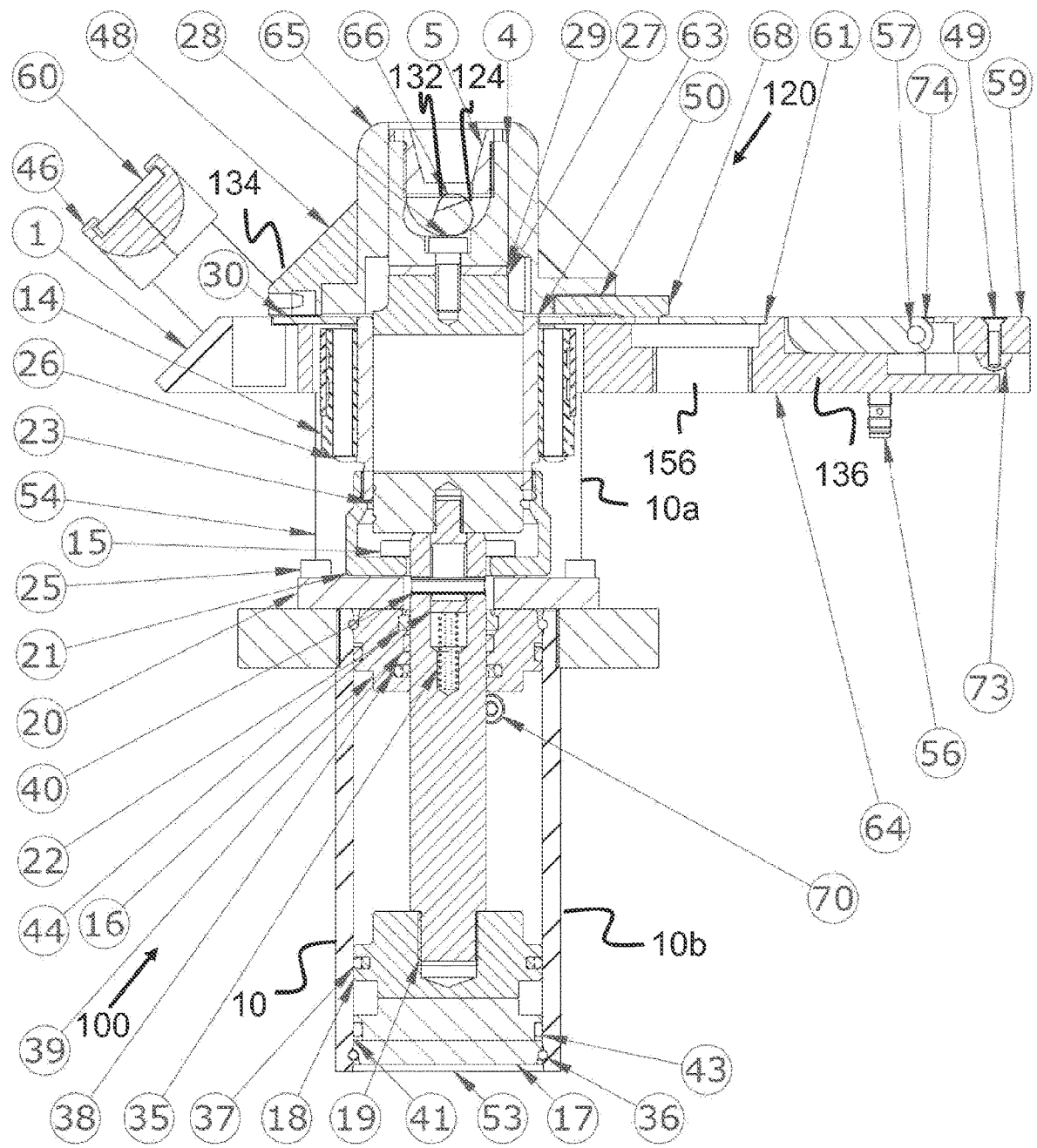
FIG. 10 is a sectional side view of a mounting press according to the present disclosure.

Referring to FIG. 10, a sectional side view is shown of a mounting press 100 with the sliding closure device 120 in the position of use of the sliding carriage 134 and the closed position of closing lever 130, in this example lever 60. The cylinder 10 is divided into a sample cylinder 10a and a pressure cylinder 10b and comprises a cylinder tube 53. On the front side, the granular material compartment 1 is provided to receive excess granular material. Cam guide 4 and cam lock 5 together define a movement space 124 for the closure shaft 132, in the present example implemented by eccentric bolt 66.

For heating and cooling a sample (not shown) inserted in the cylinder 10, a heating/cooling unit 14 is arranged laterally of the pressing region. Heating/cooling unit 14 annularly surrounds the cylinder 10. The heating/cooling unit 14 is supplied with water through hose lines 34 (cf. FIG. 12, for example). A press mold 63 with a specific diameter is inserted into the sample cylinder. Press mold 63 is exchangeable in order to account for different sample diameters. In the present example, a 50 mm press mold 63 is used.

The lower pressure cylinder 10b has a cylinder head 16 and a cylinder bottom 17. A piston 18 is movably disposed within the pressure cylinder 10b. Piston 18 is connected to the upper-lower piston 23 through a piston rod 19 such that a change in the position of the piston 18 induces a change in the position of the upper-lower piston 23. The upper piston 27, in this case a pressing piston 27, is positioned by the sliding closure 120 and blocked by the pressure built up in the sample cylinder 10a. Hydraulic fluid is supplied to or returned from the pressure cylinder 10b through high-pressure hose 55, for example through hydraulic port 70.

The closing lever 130, in this case a lever 60, may have a grip surface 46 for improving haptics.

A first position sensor 56 such as a proximity switch 56 may be used in the carriage support 136. In the present example, the proximity switch 56 is adapted to identify whether the support plate 74 is retracted or is extended, which means that the sliding carriage 134 may have taken up a service position (cf. FIGS. 18 to 23, for example). In order to take up the service position, the sliding carriage 134 is displaced on the carriage support 136 as far as to the pivot plate 59 and is pivoted about the axis 73 on the pivot plate 59. Here, the position sensor 56 is implemented as an inductive proximity switch 56, e.g. with a normally open design.

In the present example, a covering plate 61 is inserted in the carriage support 136, which covers the suction connection passage 156 embedded in the carriage support. A suction covering 68 is attached to the sliding carriage 134 in this example.

The position of use of the sliding carriage 134 is detected by a front side position sensor 30 which for example is an inductive position sensor 30.

Figure 11:
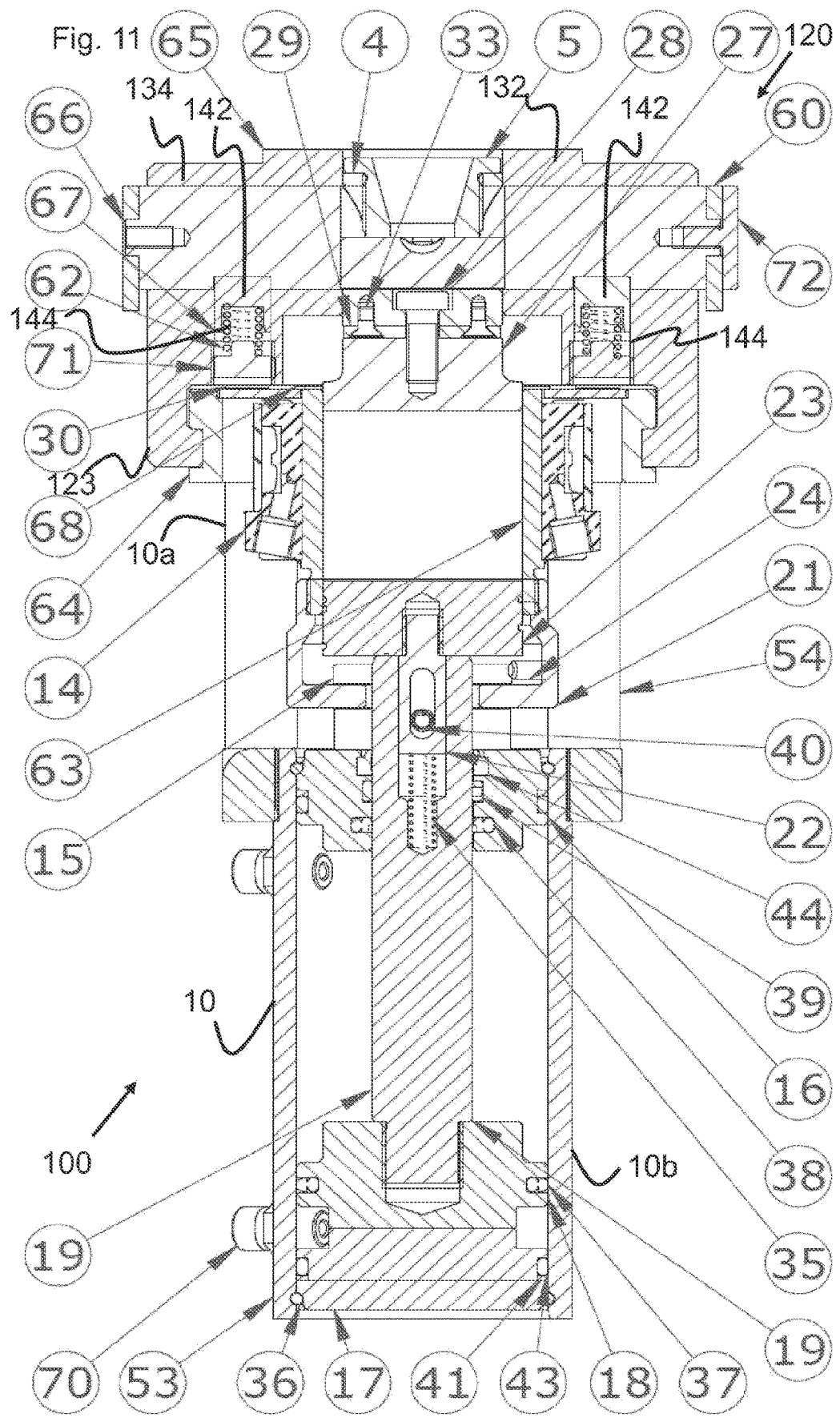
FIG. 11 is a sectional front view of a mounting press according to the present disclosure.

Referring to FIG. 11, which shows the embodiment of FIG. 10 in a sectional front view in which the same reference numerals designate the same elements. Sliding carriage 134 is in the position of use, and lever 60 is in the closed position. Carriage guide 122 is implemented by a slide guide 64 in this embodiment, so as to engage around the guide pins 123 of the sliding carriage 134 and so as to provide for a reliable guidance of the sliding carriage 134 on the carriage support 136.

In the closed position, the closure shaft 132 has a respective recess 142 on its lower surface on either side of the sample cylinder 10a, in each of which a spring element 144 is engaged, in the present case a spring compressor 71.

The heating/cooling unit 14 is supplied with cooling water through hoses 34.

Figure 12:
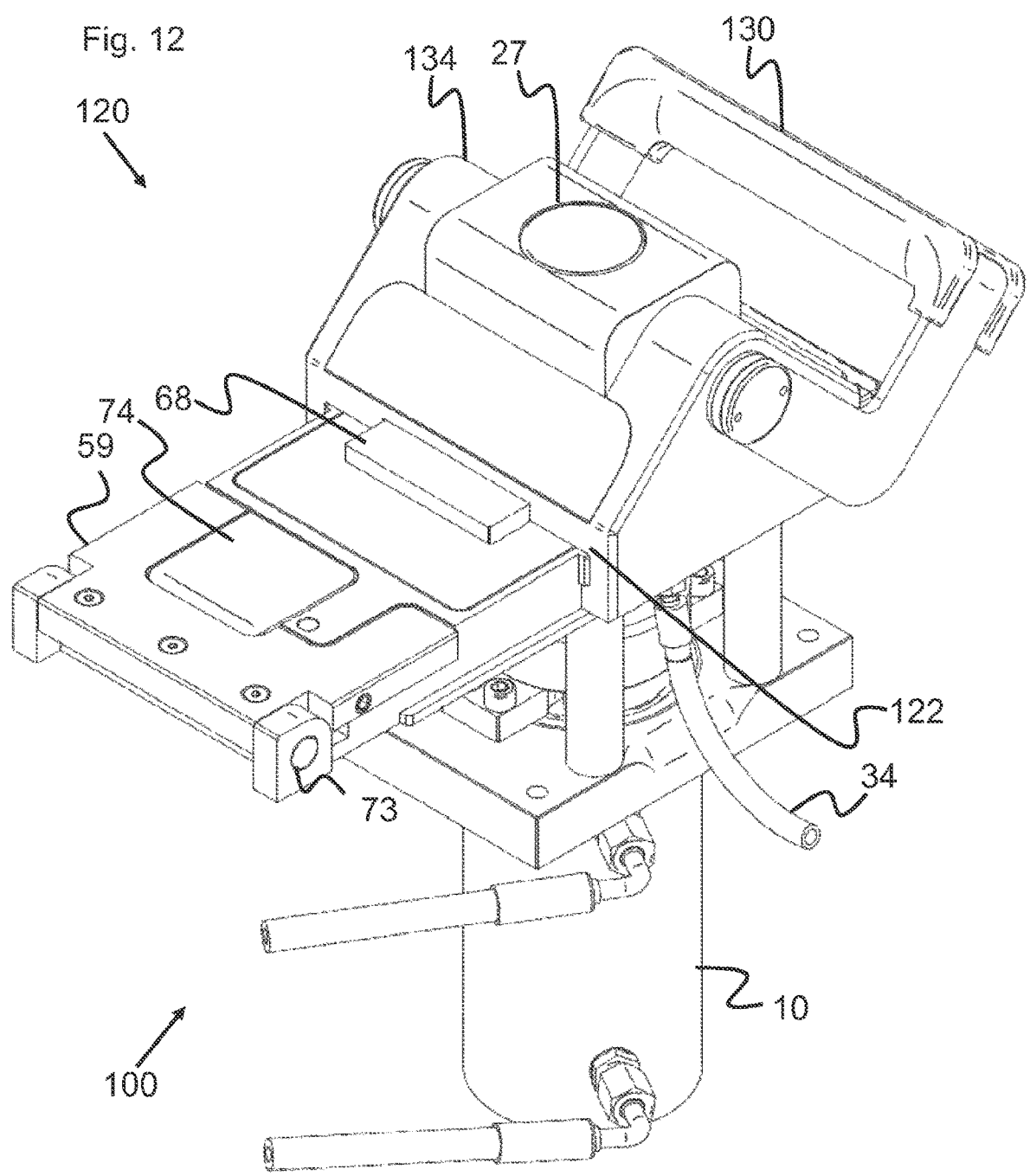
FIG. 12 is a view of a mounting press.

FIG. 12 shows a schematic view of a mounting press 100 with sliding closure 120 in the position of use, in which the cylinder opening 11 (cf. FIG. 15, for example) is completely closed. Due to the engagement of the upper piston 27 in the sample cylinder 10a and the established pressure in the sample cylinder 10a, the sliding closure 120 is held in the closed position. Here, the sliding carriage 134 builds up pressure on the carriage guide 122, optionally via the guide pins 123, and is thus supported by the carriage support 136.

In the open position of the sliding closure 120, the sliding carriage 134 can be displaced along the carriage support 136 as far as to a rear end position in which the guide pins 123 no longer engage in the carriage guide 122, since the carriage guide 122 extends only over a portion of the carriage support 136.

In the rear end position, the sliding carriage 134 can then be pivoted about the pivot axis, while it is supported on the pivot plate 59. Latching in the service position can be achieved by means of the support plate 74.

Figure 13:
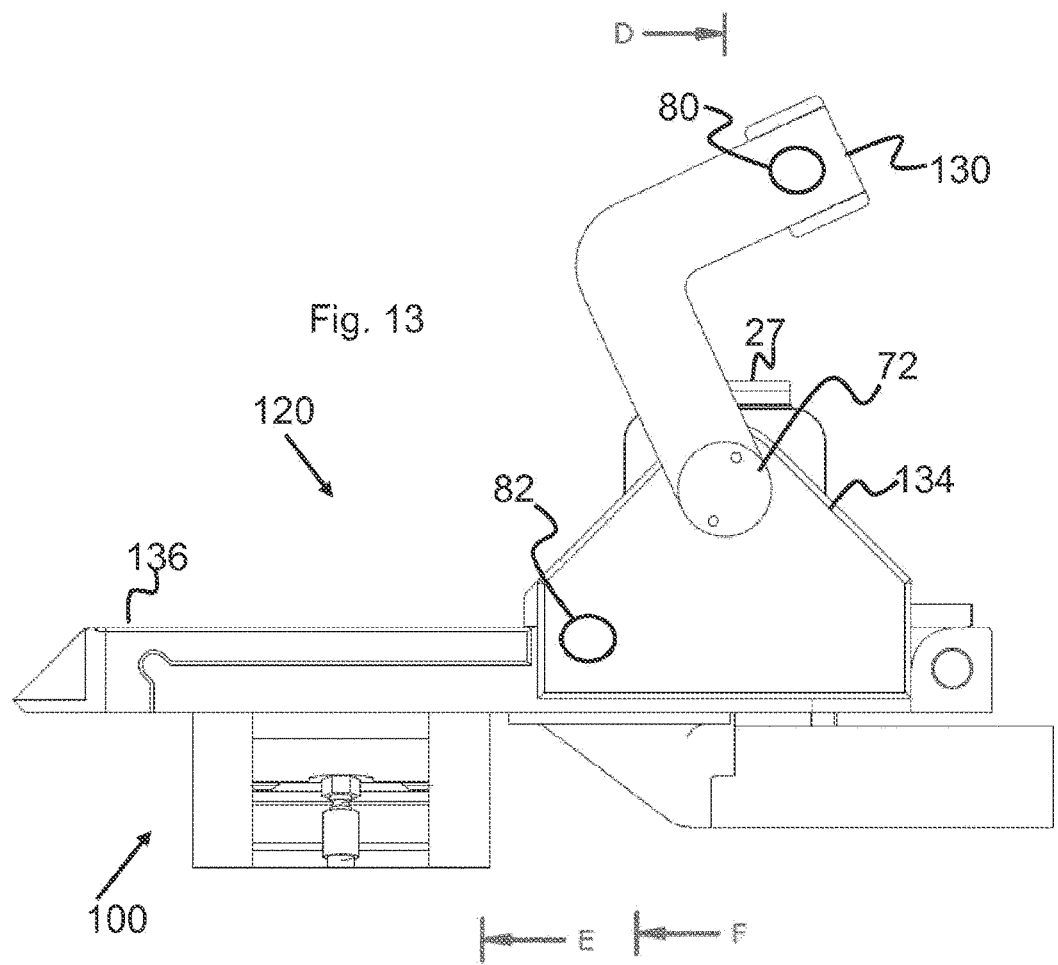
FIG. 13 is a schematic side elevational view of a mounting press with the closing lever opened.
Figure 14:
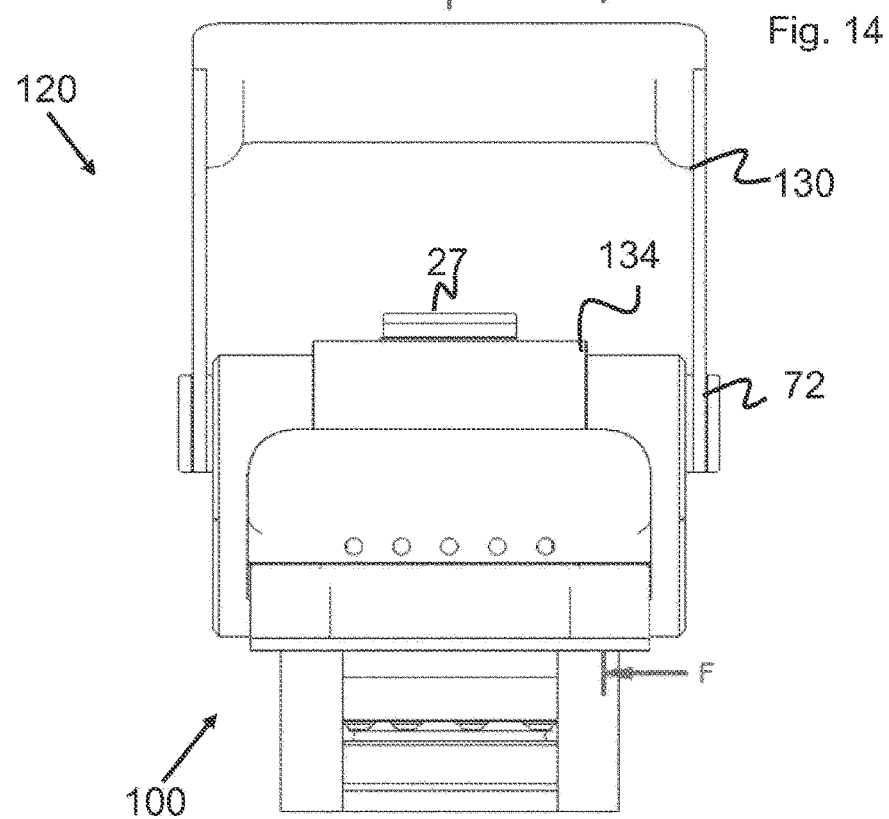
FIG. 14 is a schematic front elevational view of a mounting press with the closing lever opened.

FIG. 13 shows a side elevational view of the mounting press 100 with the sliding closure displaced toward the rear end position, so that the cylinder opening (cf. FIG. 15, for example) is cleared. In FIG. 13, the closing lever 130 has a closing lever sensor 80 integrated therein, which together with the second closing lever sensor 82 allows for position recognition of the closing lever 130. For example, the closing lever sensor 80 can be used for querying the closed position of the closing lever. FIG. 14 shows a front elevational view with the same position of the sliding carriage 134.

Figure 15:
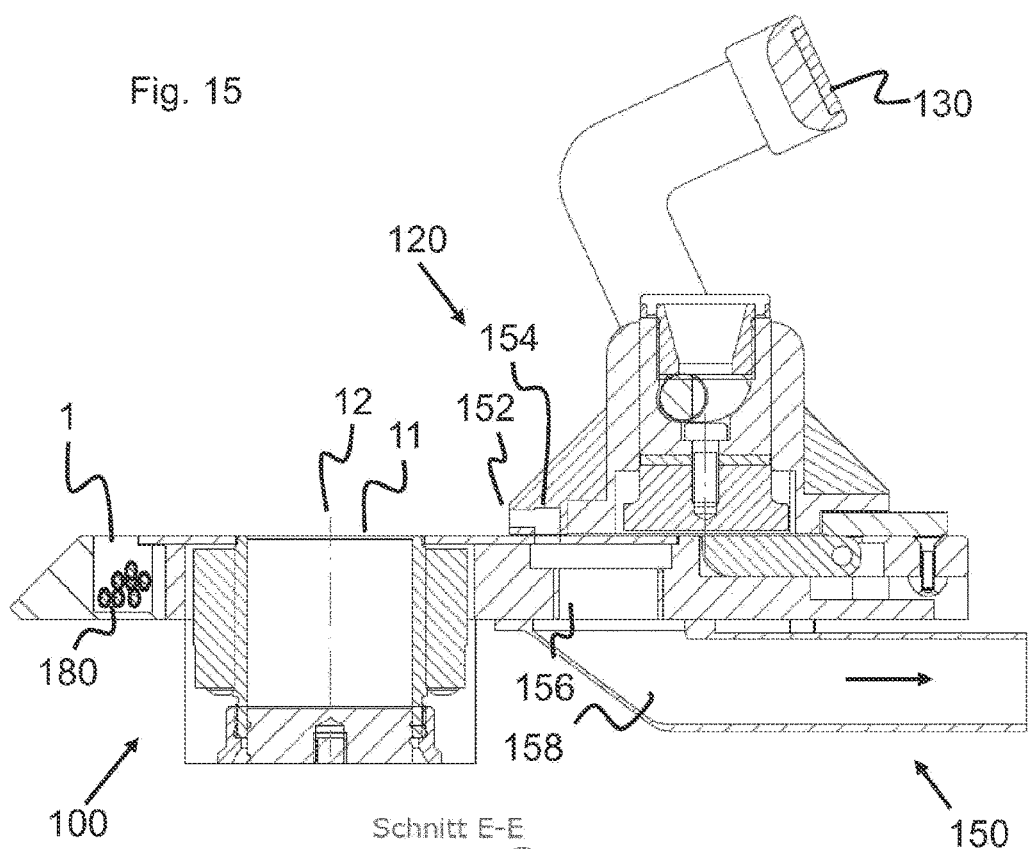
FIG. 15 is a sectional side view of a mounting press with the closing lever opened.

Referring to FIG. 15, a sectional side view is shown of a portion of the mounting press 100 with the sliding carriage in the position described in conjunction with FIG. 13. The mounting press 100 of the embodiment shown in FIG. 15 comprises a suction device 150 which is ready for operation in the suction position of the sliding carriage 134 shown in the figure. Suction opening 152 is in communication with the suction connection passage 156 embedded in the covering 136 or carriage support 136 through the sliding carriage passage. Suction air passage 158 directly follows said connection passage 156.

FIG. 15 furthermore shows the cylinder axis 12. Moreover, the granular material compartment 1 shown in FIG. 15 contains granular material 180 that was introduced into it by the sliding carriage 134.

Figure 16:
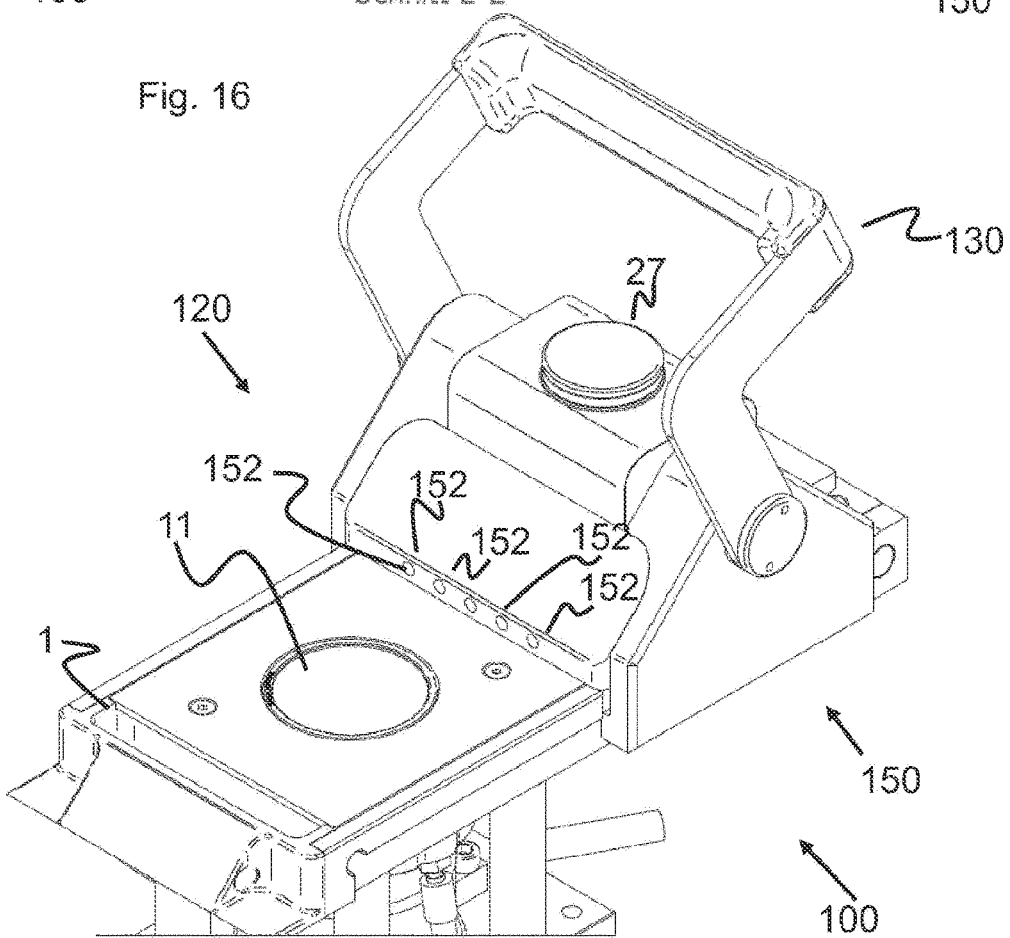
FIG. 16 is a perspective view of a mounting press with the closing lever opened.
Figure 17:
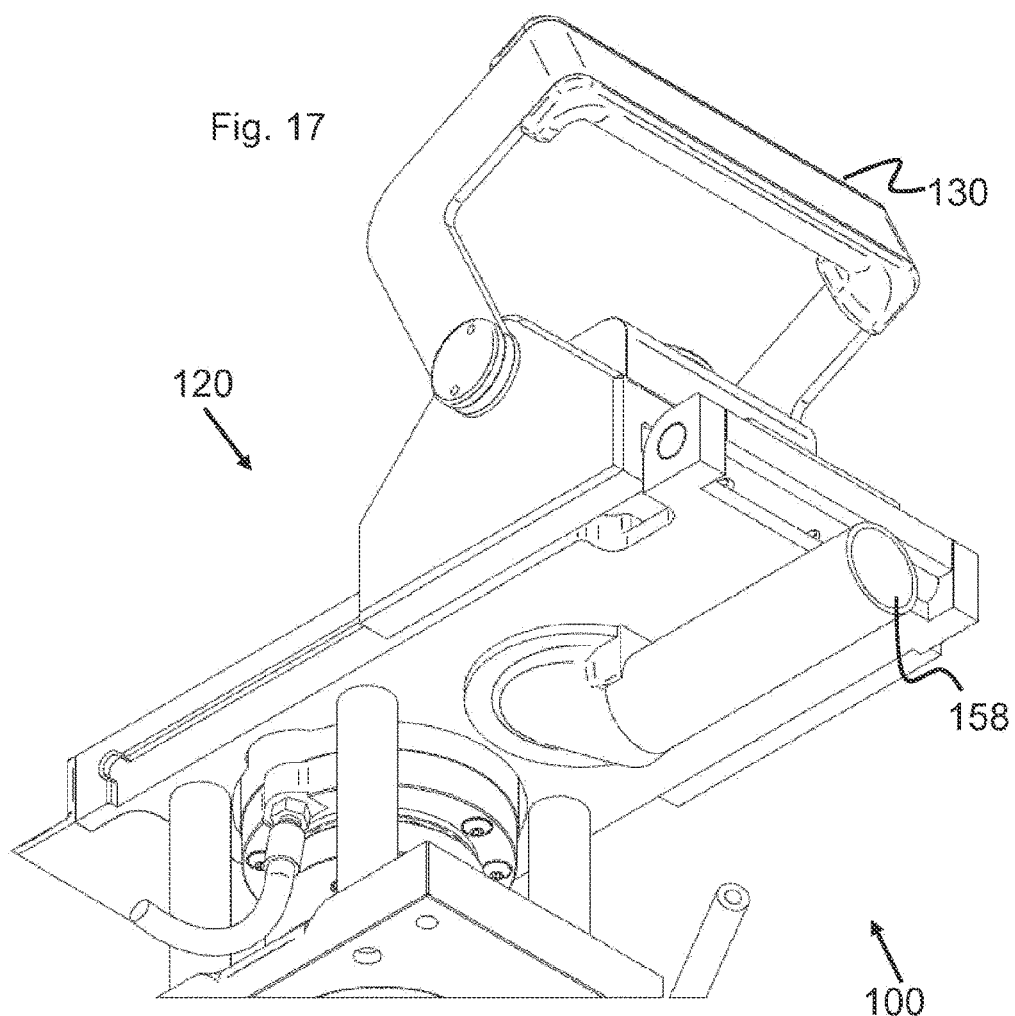
FIG. 17 is another perspective view of a mounting press with the closing lever opened.

Referring to FIG. 16, the suction position of sliding carriage 134 is illustrated by another perspective view. In this example, 5 suction openings 152 are incorporated in the front side of sliding carriage 134. FIG. 17 also illustrates the suction position of the sliding carriage 134 by way of yet another perspective view.

Figure 18:
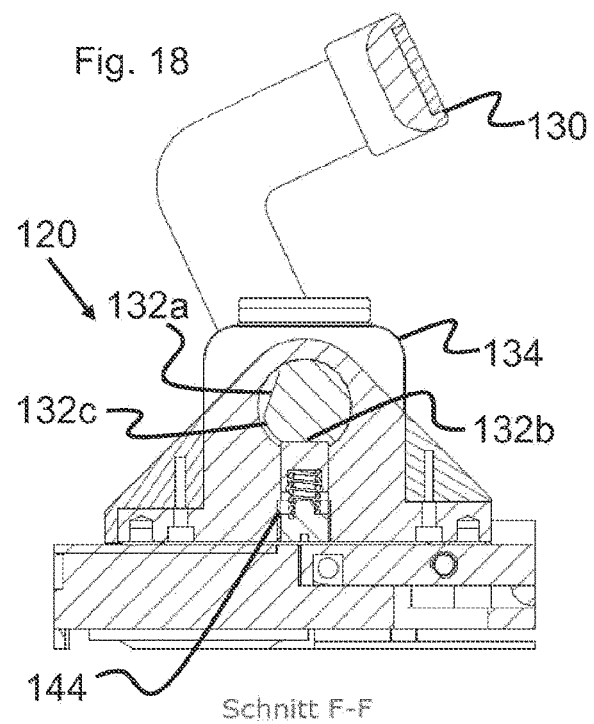
FIG. 18 is a sectional side view of a mounting press with the closing lever opened.

Referring to FIG. 18, the closing lever 130 is illustrated with the closure shaft 132 in the open position. Flexible element 144 engages on the flattened area 132*b* of the closure shaft and thus exerts a retaining force on the closing lever 130. In order to transfer the closing lever 130 from the open position to the closed position, the flexible element 144 has to be diverted downwards, as seen in the drawing plane of FIG. 18, by application of a force, and the force applied to the closing lever 130 is optionally amplified by the cam 132*c* of closure shaft 132 and is transferred to the flexible element 144.

FIG. 19 illustrates the service position of sliding carriage 134, while the sliding carriage 134 is supported in the service position by support plate 74 hinged to carriage support 136.

FIG. 20 shows a further embodiment of the mounting press 100 with a sliding carriage 134 in the service position, and in this embodiment the support plate 74 is hinged to the sliding carriage 134 and is supported in the recess in the carriage support 136. In this position, the closure shaft 132 is completely offset to one side within the movement space 124.

Referring to FIGS. 21 to 23, the mounting press 100 is shown from the front side with the closure device 120 in the service position, also illustrating the easy accessibility of the upper piston 27 from the bottom. Here, one embodiment of suction device 150 is additionally illustrated. Suction openings 152 open into the sliding carriage passage 154. If the sliding carriage 134 is in the suction position, the lower-side opening of the sliding carriage passage 154 is aligned flush with the recess of suction connection passage 156, so that an underpressure generated on the bottom side will cause a suction effect at the suction openings 152 through the suction connection passage 156 and the sliding carriage passage 154. FIG. 22 shows a perspective view of this embodiment. FIG. 23 likewise shows the mounting press 100 with the closure device 120 in the service position in a further perspective view. FIGS. 22 and 23 clearly show the position sensor 30 at the front side, which detects the position of the sliding carriage 134 in the position of use.

Figure 24:
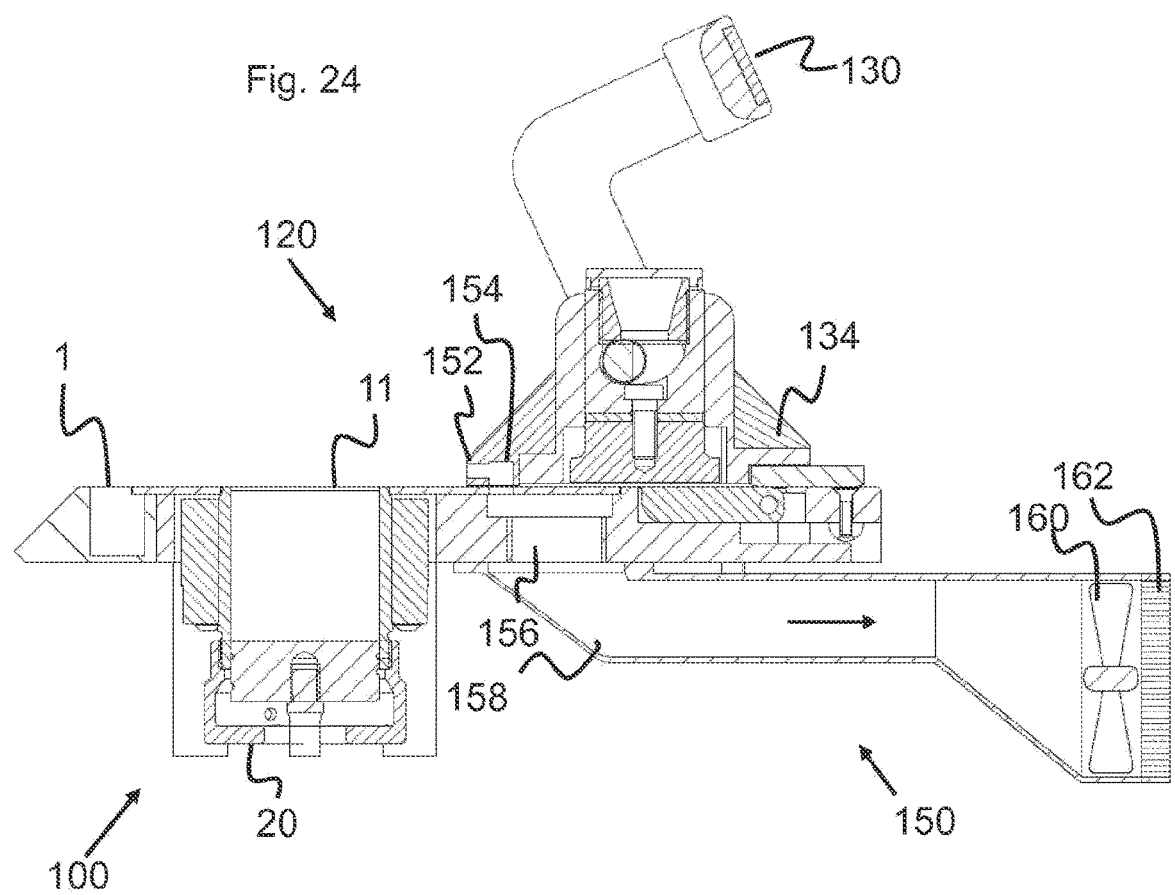
FIG. 24 is a sectional side view of a mounting press with suction device.

Referring to FIG. 24, the mounting press 100 is shown in a sectional side view, with the sliding carriage 134 in the suction position. Suction opening 152 opens into the sliding carriage passage 154 which, in the suction position, in turn opens into the suction connection passage 156 embedded in the carriage support 136. Below suction connection passage 156, a suction air passage 158 is provided, which extracts the exhaust air, possibly with vapors and/or dusts, toward a vacuum generator 160. Downstream of vacuum generator 160 in the exhaust air direction, a suction filter 162 is arranged. The suction device 150 may be intended for extracting vapors. The suction filter 162 may, for example, as well be arranged at a suitable location within the suction air passage 158 and upstream of the vacuum generator 160, for example if larger particles are expected in the exhaust air in addition to dust, so that damage to the vacuum generator is avoided.

Figure 25:
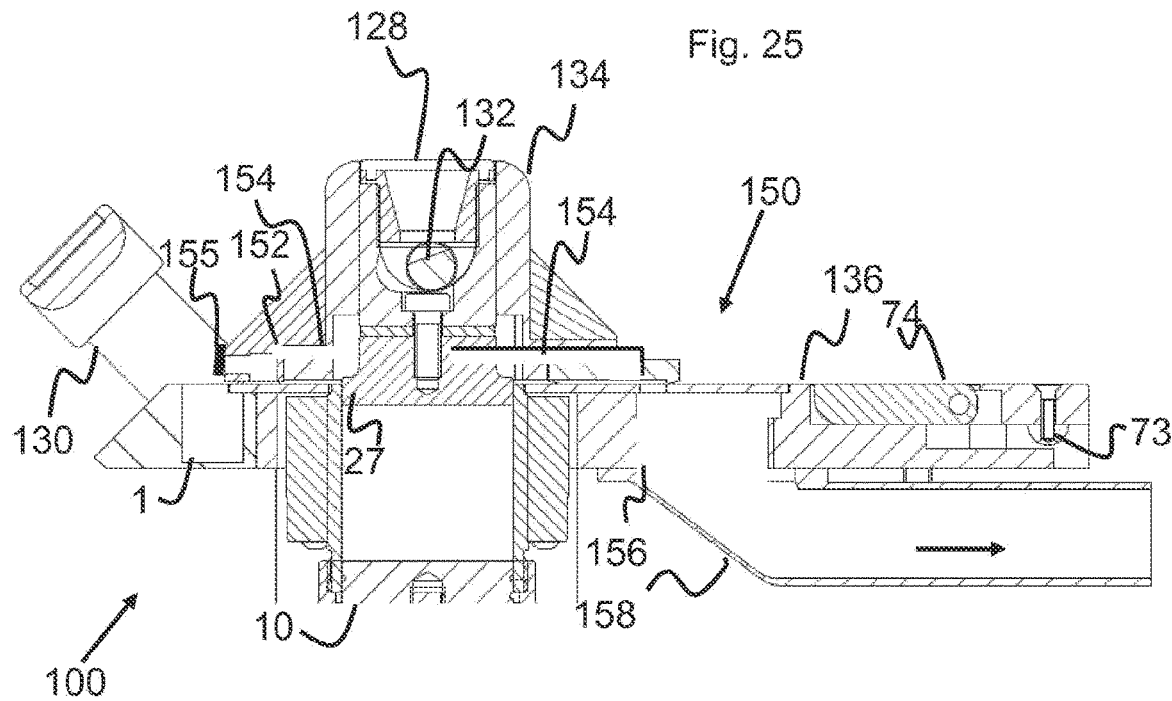
FIG. 25 is another sectional side view of a mounting press with suction device.

Referring to FIG. 25, a further embodiment of the mounting press 100 is shown with a sliding closure 120 in the closed position, and a suction device 150 is implemented, which ensures suction operation even in the closed position and for example during operation and heating operation of the mounting press. The suction opening 152 is disposed around the upper piston 27. Optionally, the front side suction opening which was in use in the suction position of the sliding carriage 134 is closed by a suction cover 155 which is arranged or attached on the closing lever 130. Thus, the closing lever 130 does not only close the mounting press 100 for starting the operation, but also seals the front side suction openings 152 so that the vacuum generator 160 can concentrate the suction effect for the operation of the mounting press 100 to the region of the cylinder opening 11. So if, for example, vapors escape from the sample cylinder 10*a* during the heating operation and hence during the melting process of the granular material, which vapors might be harmful to the environment or harmful to health, the suction device 150 of the present embodiment is able to accommodate such influences as well, so that the application experience of the mounting press is improved.

Figure 26:
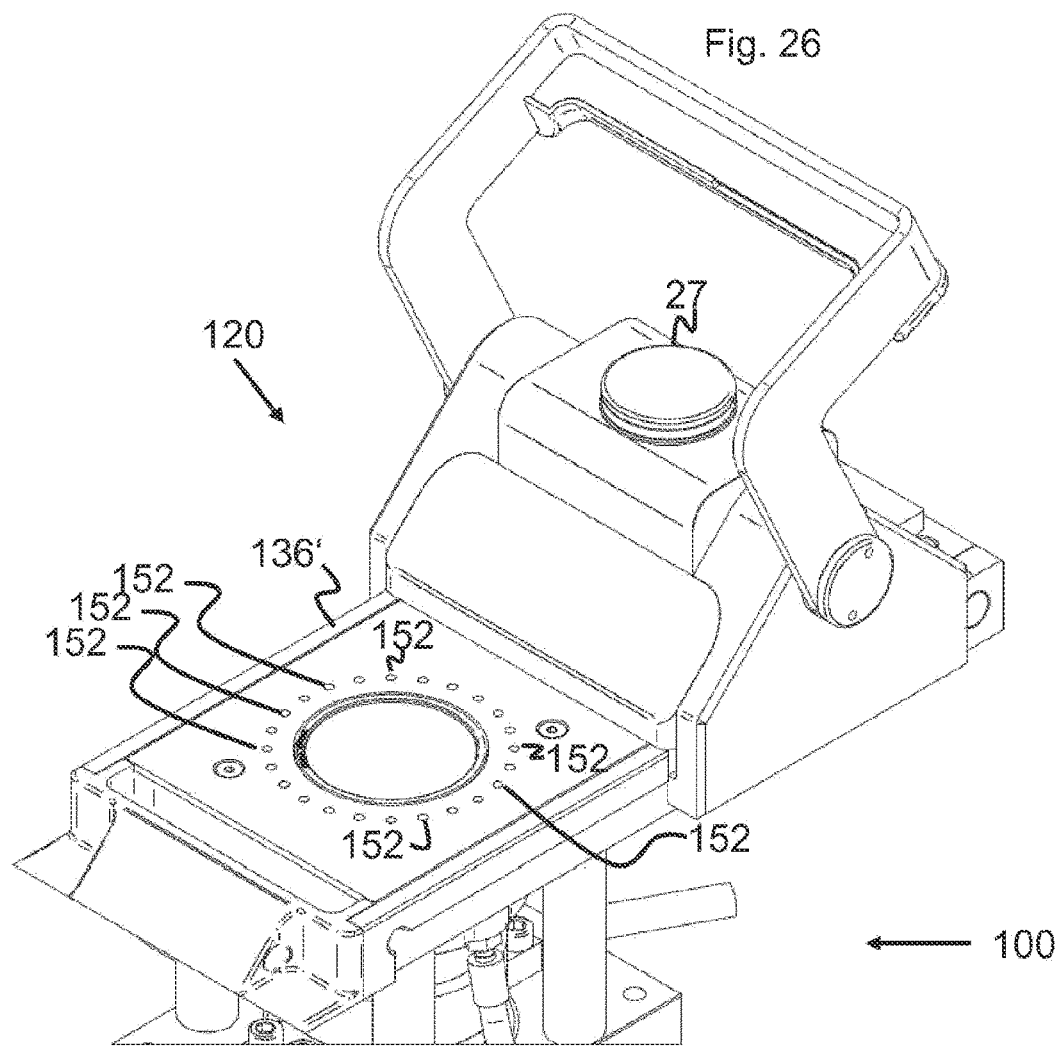
FIG. 26 is a perspective view of a mounting press with suction device.

Referring to FIG. 26, another embodiment of the mounting press 100 with sliding closure 120 is shown, which includes suction openings 152 introduced in the covering 136' and in the carriage support 136, respectively. In this example, the suction openings are arranged concentrically around the cylinder opening 11. A suction effect at the suction openings 152 can be generated from below the covering 136' through a suction air passage 158 that is provided there.

Figure 27:
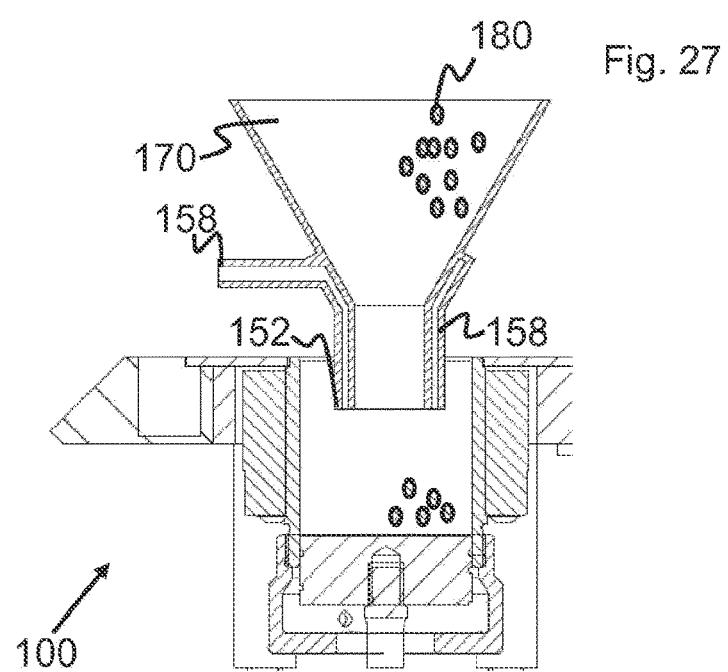
FIG. 27 is a perspective view of a mounting press with suction device and filling funnel.

FIG. 27 shows yet another embodiment of the mounting press 100, with a funnel 170 inserted in the cylinder opening 11 for filling granular material 180. The funnel may be connected to the vacuum device 160 through the suction air passage 158 in order to remove dusts directly during the filling using a funnel.

Figure 28:
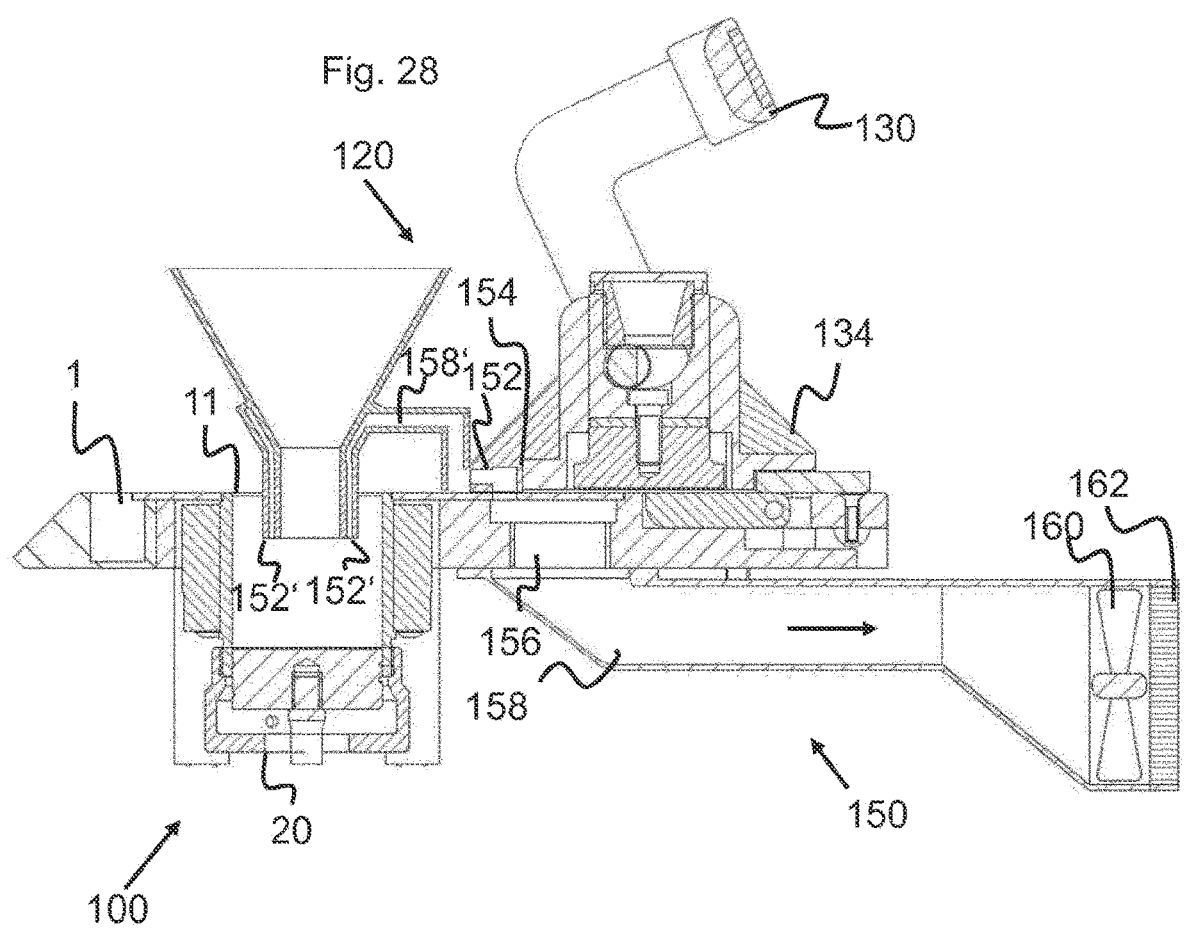
FIG. 28 is a sectional side view of a further embodiment of a mounting press with suction device and filling funnel.

Referring to FIG. 28, another embodiment of the mounting press 100 is shown, with the funnel 170 inserted for filling granular material 180 into the cylinder opening 11, and the funnel is connected to the suction device 150. The suction opening 152' provided on the funnel and annularly extending around the lower funnel opening of the funnel 170 is in communication with a funnel suction air passage 158'. The filling funnel 170 may now preferably be positioned such that the funnel suction air passage 158' can be aligned with the suction opening 152 provided in the sliding carriage 134. The vacuum generator 160 can thus provide an extracting low pressure on the funnel 170 as well.

Figure 29:
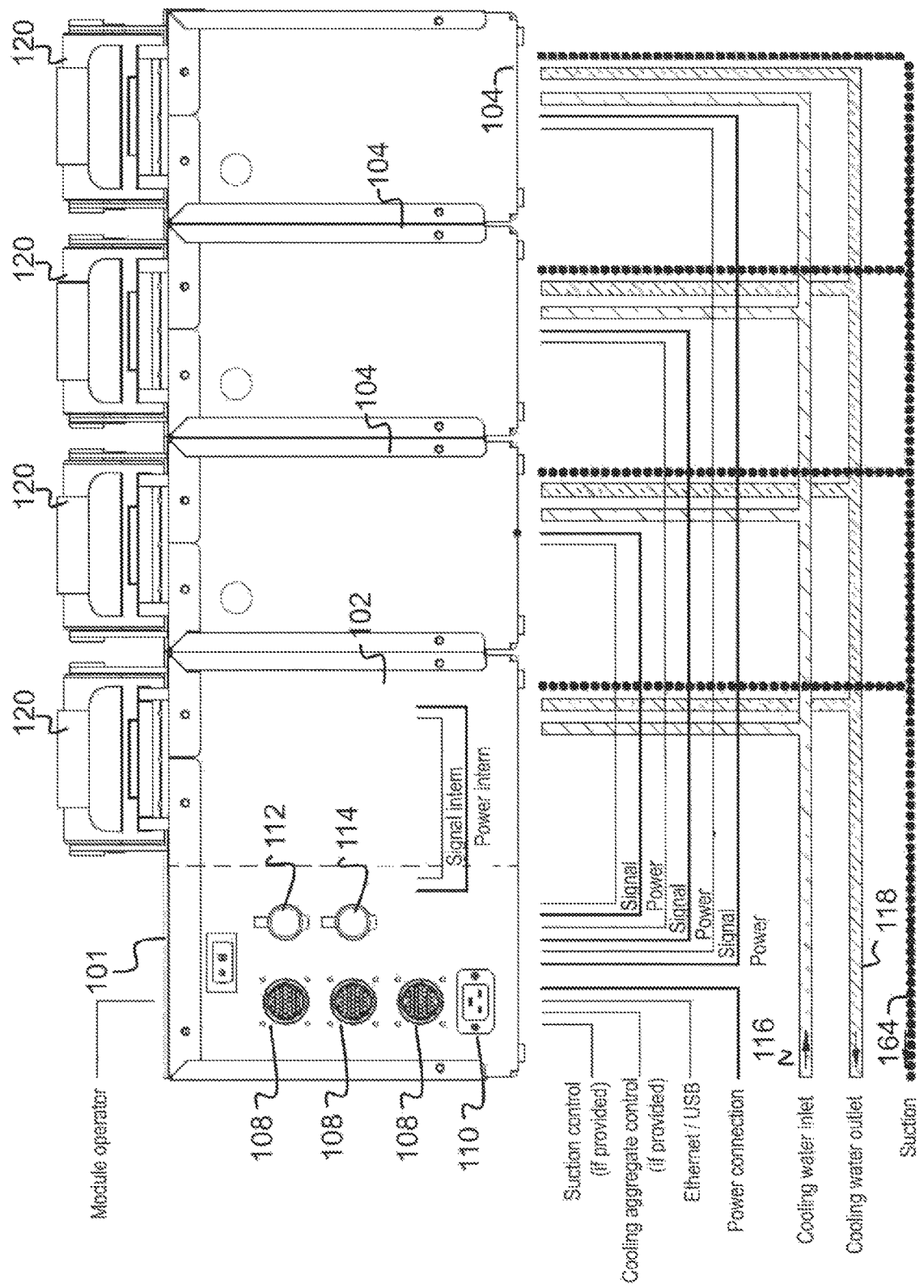
FIG. 29 is a schematic view of the rear side of a modular mounting press system.

Referring to FIG. 29, an embodiment of the modular mounting press system 106 is shown in a rear view, comprising an internal mounting press 102 arranged in the basic module 101 and three external mounting presses 104. All mounting presses 102, 104 have a sliding closure 120 and are arranged directly adjacent to one another.

The basic module 101 has three mounting press connectors 108 on the rear side, for transferring both the electrical power required by the external mounting presses 104 and control data for controlling the external mounting presses 104. Furthermore, the basic module 101 has a central power supply port 110 for supplying all the mounting presses 100, 102, 104 with electrical power from the external power supply, such as the public power grid. Furthermore, the basic module 101 comprises a cooling water inlet 112 and a cooling water return line 114, which are supplied either from an external water supply or a circulation circuit with heat exchanger, for example. The modular mounting press system 106 comprises a water busbar 116, 118 for connecting the mounting presses 102, 104. Furthermore, central suction 164 is provided, which can be controlled and adjusted from the basic module 101.

FIGS. 30 to 34 show different variants of operation of the modular mounting press system. FIG. 30 shows a single external mounting press 104 for being connected to a basic module 101 according to the present disclosure. The external mounting press 104 comprises the sliding closure 120. Furthermore, the external mounting press 104 is equipped with a control button 96 and an indicator device 98.

FIG. 31 shows a basic module 101 comprising an internal mounting press 102. The basic module 101 has a central input device 94 which can be used to program and control the internal and external mounting presses 102, 104. Furthermore, the basic module has a control button 96 and an indicator device 98. The indicator device is implemented as a light ring 98 arranged around the control button 96. Furthermore provided in the basic module 101 is the central control device 92 which generates and outputs control parameters for the internal and external mounting presses 102, 104. Furthermore, a power distributor 91 is provided in the basic module 101, through which the electrical power provided by the basic module 101 is distributed to the internal and external mounting presses 102, 104.

Figure 32:
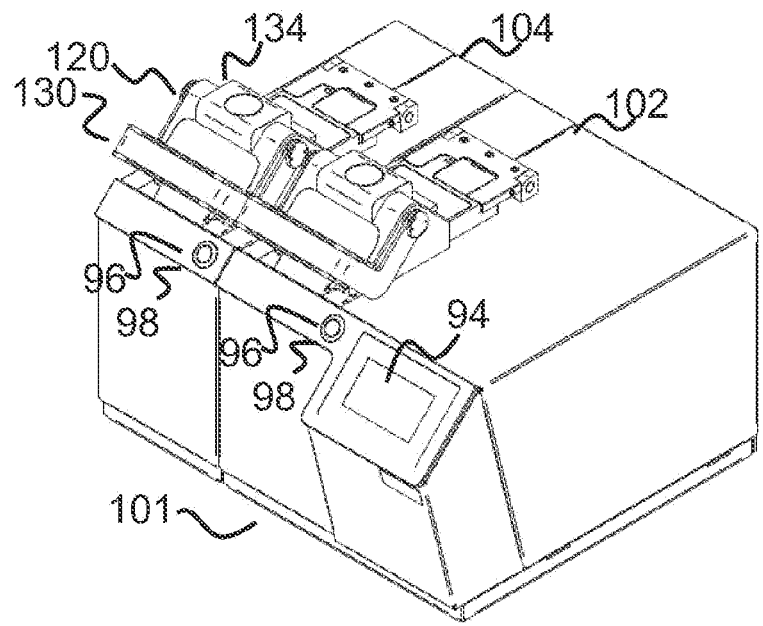
FIG. 32 shows a modular mounting press system with basic module and external mounting press.
Figure 33:
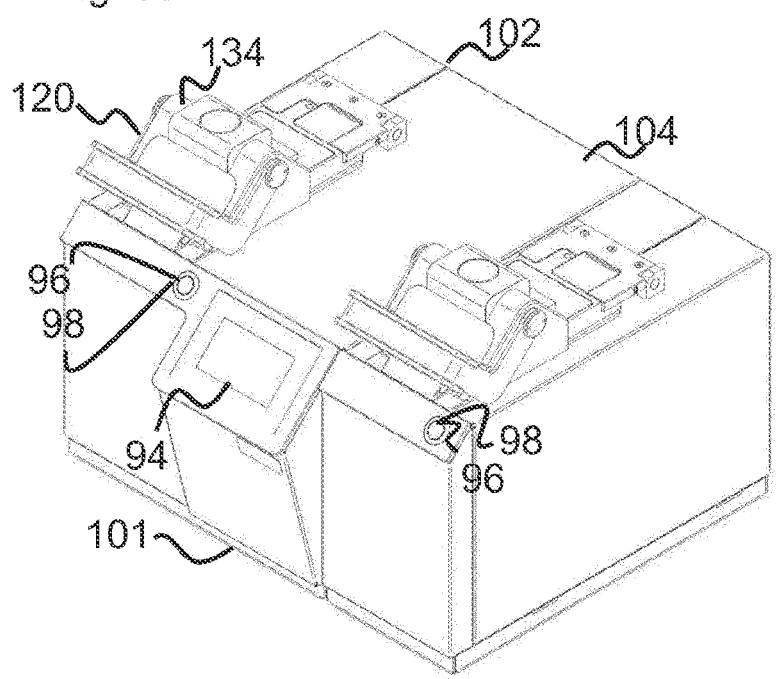
FIG. 33 shows a further arrangement of a modular mounting press system with basic module and external mounting press.

FIG. 32 shows a modular mounting press system 106 comprising an internal mounting press 102 and an external mounting press 104. Both mounting presses 102, 104 are equipped with the sliding closure 120 and a control button 96 and an indicator device 98. The basic module 101 furthermore has a central input device 94 for programming and controlling all mounting presses 102, 104 connected to the basic module. FIG. 33 shows another alternative arrangement of the modular mounting press system 106 with an internal mounting press 102 and an external mounting press 104.

Figure 34:
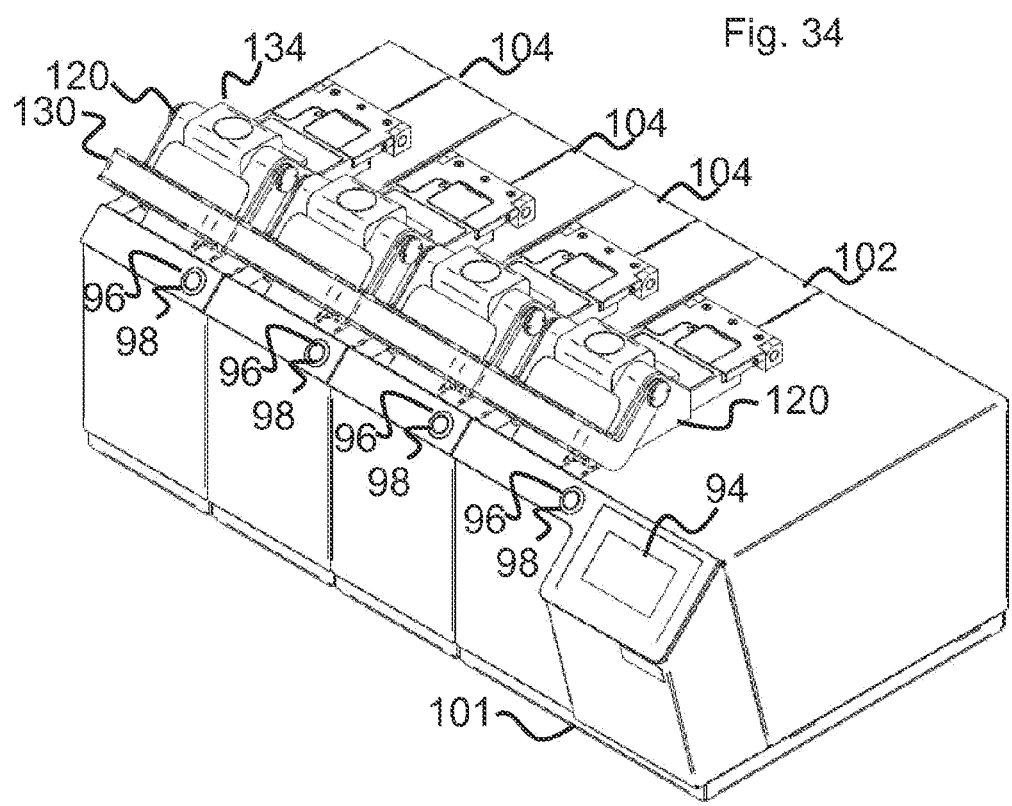
FIG. 34 shows a modular mounting press system with basic module and three external mounting presses.

Finally, FIG. 34 shows a modular mounting press system 106 comprising an internal mounting press 102 and three external mounting presses 104, each of which is controlled and programmed by the basic module 101 and supplied with electrical power by the basic module 101. The respective mounting presses 102, 104 may be configured identical to each other. However, the respective mounting presses 102, 104 may also be configured differently with regard to the closure system 120 or the suction device 150. With this system, it is moreover easily possible, for example, to provide different press molds 63 in the mounting presses 102, 104, so that different mounting presses 102, 104 can be employed for different sample diameters without having to exchange the press mold 63.

Figure 35:
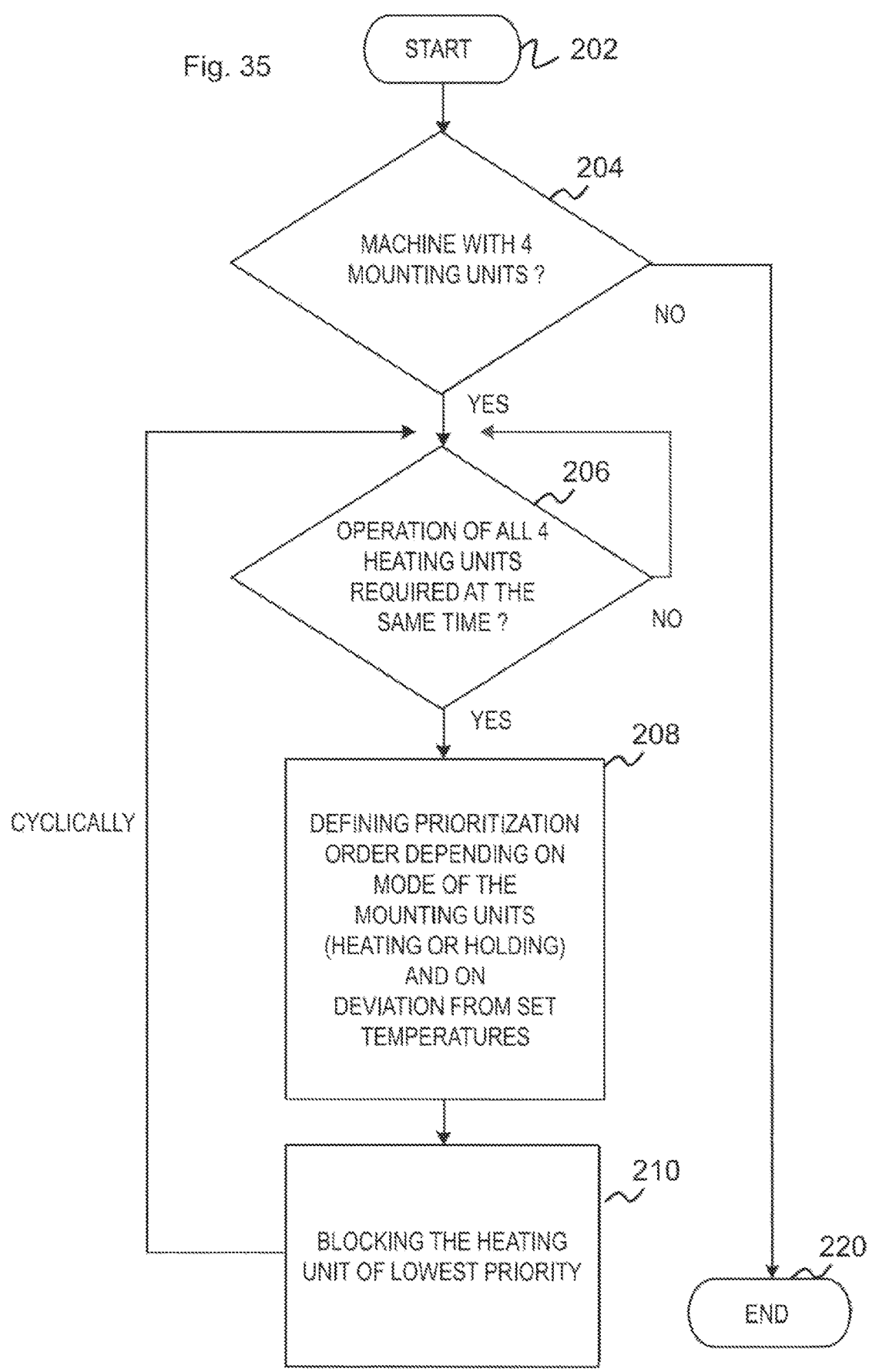
FIG. 35 is a schematic flowchart for the power control of a plurality of mounting presses.

FIG. 35 shows a simple flowchart for the modular mounting press system 106. In a first step 202, a process starts. For example, the process start may mean that one or more mounting presses 102, 104 of the modular mounting press system 106 are already in operation and the user has activated a further mounting press 102, 104 via the central input device 94. The basic module 101 comprises the central control device 92 which is used to control the mounting presses 102, 104. Control device 92 now checks, in step 204, how many mounting presses 102, 104 have to be supplied with electrical power by the basic module 101, for example on the basis of the data provided by the power distributor 91. In the present example, prioritization of power distribution is only applied if 4 or more mounting units 102, 104 are operated. If less than 4 mounting units 102, 104 are connected or are in operation, prioritization of power distribution will not be necessary in this example, and the flowchart jumps to step 220, the end. The flowchart is based on the idea that if 3 or fewer mounting units are operated in parallel, sufficient power will be available for simultaneous full operation of all mounting units 102, 104.

If the response to the query for 4 or more mounting units 102, 104 is positive, the next query made in step 206 will be as to whether all of the at least 4 heating/cooling units 14 of the at least 4 mounting units 102, 104 have to be supplied with power. If not all of the heating/cooling units 14 are operated in parallel, the flowchart loops back to regularly check the status of the mounting units in step 206.

However, if at least 4 heating/cooling units 14 are required in parallel, a prioritization order is defined in step 208 depending on the mode of the mounting units (heating or holding) and on deviation from target temperatures. In step 210 it is predetermined which power distribution is to be performed, in the present example the heating unit of mounting units 102, 104 having the lowest priority is blocked. This query is also repeated cyclically as long as the conflicting parallel operation of more than 3 mounting units 102, 104 is proceeding.

Figure 36A:
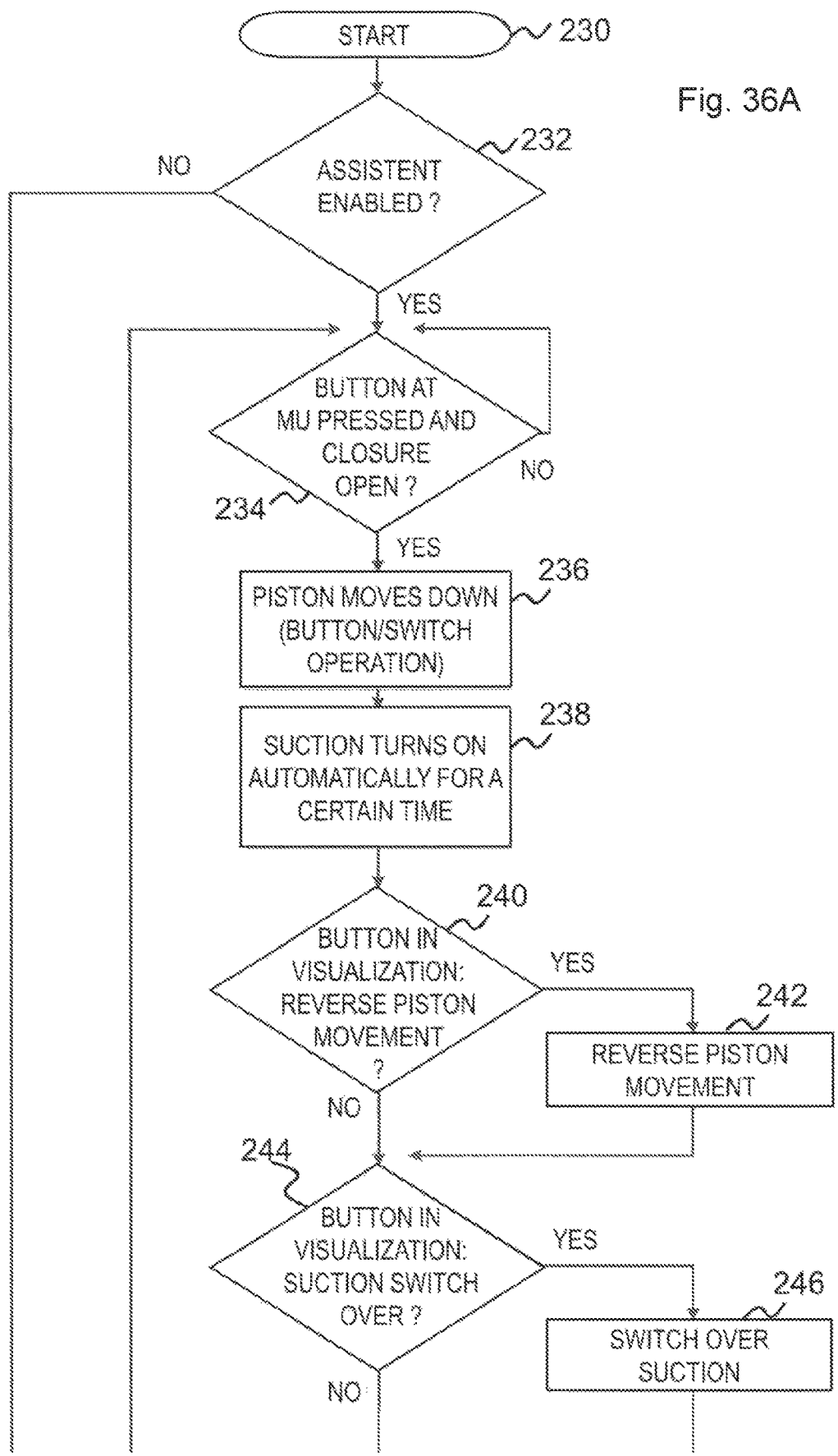
FIG. 36A and FIG. 36B show a further flowchart of a filling assistant.
Figure 36B:
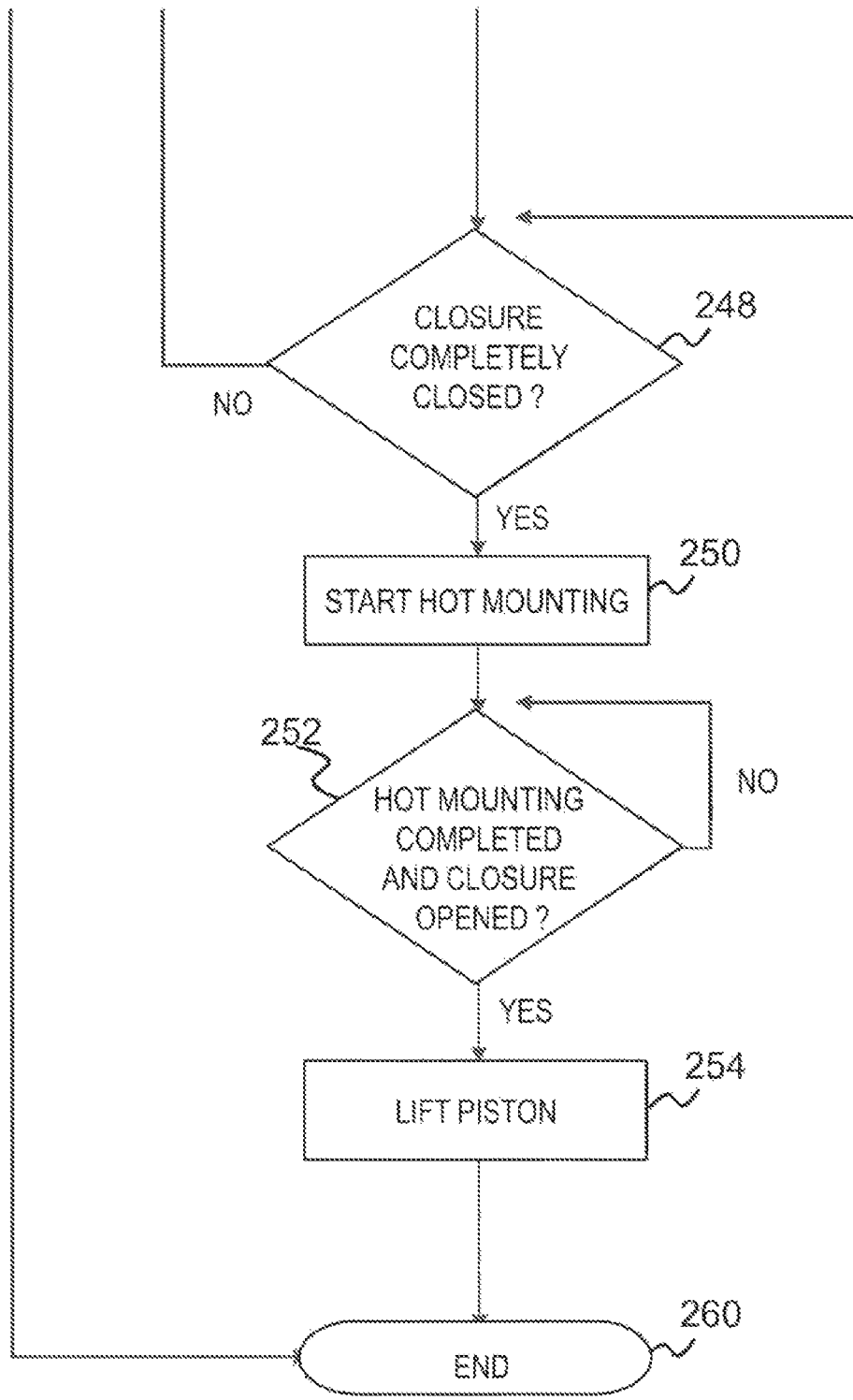

Referring to FIG. 36A and FIG. 36B, a flowchart for a filling assistant is shown. In a step 230, program flow is started and a first query is made in step 232 as to whether the assistant has been enabled. If not, the flowchart aborts and ends at step 260.

If the assistant has been enabled, the query made in step 234 is whether the button 96 has been pressed on a mounting unit (MU) 102, 104 and a closure 120 has been opened. In other words, in step 234 the assistant expects the selection of a mounting unit 102, 104, for example via the control button 96 on the embedding unit 102, 104 in order to proceed with the process.

In response to the request or selection of a mounting unit 102, 104, the piston 23 of the selected mounting unit 102, 104 will be lowered in the next step 236 (button/switch operation). In step 238, the suction device on the selected mounting unit 102, 104 or the central suction device 164 is automatically enabled for a predefinable period of time.

In step 240, a query is made as to whether the respective button with respect to a reverse piston movement has been set in the visualization. If reverse piston movement is desired, the piston movement is reversed in step 242.

In step 244, a query is made as to whether suction switch over has been set in the visualization. If this is the case, suction is switched over in step 246.

Finally, in step 248, the position sensors 30, 56, 80, 82 are queried for the closed position of the sliding closure 120 of the selected mounting unit 102, 104. If it is determined that the closure 120 is completely closed, then the hot mounting can be started in step 250.

Once the hot mounting operation by the selected mounting unit 102, 104 has been completed, it is queried in step 252 whether the closure can be opened. If this is the case, the piston 23 is lifted in step 254 and the filling assistant is terminated in step 260.

The present disclosure provides for a comfortable, rapid and safe operation of a mounting press 100, 102, 104 that comprises a suction device, and for an improvement of work safety by the integrated extraction of dusts and/or vapors in a mounting press 100, 102, 104. So, the present disclosure allows to operate a mounting press 100, 102, 104 that comprises the suction device 150 of the present disclosure in a more comfortable manner and faster, while consistent safety is ensured.

Interruptions in the processing for venting purposes and waiting for dust clouds to disappear are no longer necessary. The present disclosure can be combined with a sliding closure and/or can be integrated in a modular mounting press system. Thus, the sliding closure 120 provides for easy access to the upper piston 27 disposed within the sliding closure 120, for example for being easily cleaned or replaced.

It will be apparent to a person skilled in the art that the embodiments described above have to be understood as examples and that the present disclosure is not limited thereto but can rather be varied in multiple ways without departing from the scope of the claims. Furthermore, it will be apparent that the features, irrespectively whether disclosed in the specification, the claims, the figures, or otherwise, individually define components of the present disclosure, even if they are described in conjunction with other features. In all the figures, the same reference numerals designate the same elements, so that descriptions of elements that are possibly mentioned only in conjunction with one or at least not with all of the figures can also be applied to those figures in conjunction of which those elements have not been explicitly described in the specification.

The invention claimed is:

1. A modular mounting press system for hot mounting samples comprising:
   a basic module for controlling at least one external mounting press; and
   a first external mounting press separate from and controllable by the basic module, and having:
   a first mounting cylinder for receiving samples to be hot mounted, the first mounting cylinder having a cylinder opening at an upper end;
   a lower piston within the first mounting cylinder;
   an upper piston having at least an open position and a closed position and being transferable from the open position to the closed position and engaging the first mounting cylinder within the first mounting cylinder in the closed position so as to close the cylinder opening; and
   a heating/cooling unit for heating and cooling the first mounting cylinder;
   the basic module comprising:
      a central input device for entering process parameters for the at least one external mounting press by a user;
      a central control device in communication with the central input device and for generating and outputting control parameters and for controlling the heating process of the at least one external mounting press;
      a central power supply port for connecting the modular mounting press system to an external power supply; and
      a power distributor for providing the electrical power to the at least one external mounting press, the power distributor in communication with the central control device.

2. The modular mounting press system of claim 1, further comprising
   a hydraulic distributor for supplying cooling water to the heating/cooling unit of the at least one external mounting press.

3. The modular mounting press system as claimed in claim 2,
   wherein the basic module further comprises:
      at least one mounting press connector for electrically connecting the at least one external mounting press to the basic module for transferring the electrical power required by the heating/cooling unit of the at least one external mounting press as well as control data for controlling the at least one external mounting press.

4. The modular mounting press system as claimed in claim 1,
   wherein the basic module includes a basic module mounting press having:
   a second mounting cylinder for receiving samples to be hot mounted, the second mounting cylinder having a cylinder opening at an upper end;
   a lower piston within the second mounting cylinder;
   an upper piston having at least an open position and a closed and that can be transferred from the open position to the closed position and engaging the second mounting cylinder within the second mounting cylinder in the closed position so as to close the cylinder opening; and
   a heating/cooling unit for heating and cooling the second mounting cylinder; and
   wherein the basic module accommodates the basic module mounting press in a shared basic module housing.

5. The modular mounting press system as claimed in claim 4,
   wherein the power distributor distributes the electrical power to the basic module mounting press and to the at least one external mounting press while taking into account a prioritization order that can be predetermined by the central control device; and/or wherein the power distributor distributes the electrical power to the basic module mounting press and to the at least one external mounting press in a clocked manner under control of the central control device when reaching or exceeding a predetermined amount of electrical power.

6. The modular mounting press system as claimed in claim 3,
wherein the at least one mounting press connector, the central power supply port, and the hydraulic distributor are arranged on a rear side of the basic module.

7. The modular mounting press system as claimed in claim 1, further comprising a second external mounting press having:
a second mounting cylinder for receiving samples to be hot mounted, the second mounting cylinder having a cylinder opening at an upper end;
a lower piston within the second mounting cylinder;
an upper piston having at least an open position and a closed position and being transferable from the open position to the closed position and engaging the second mounting cylinder within the second mounting cylinder in the closed position so as to close the cylinder opening; and
a heating/cooling unit for heating and cooling the second mounting cylinder,
wherein the second external mounting press is connectable to the basic module and the second external mounting press is controlled and supplied with electrical power by the basic module.

8. The modular mounting press system as claimed in claim 1,
wherein the at least one external mounting press comprises an indicator device for indicating the operating state.

9. The modular mounting press system as claimed in claim 8, wherein the indicator device is a color-changing indicator device.

10. The modular mounting press system as claimed in claim 8,
wherein the at least one external mounting press comprises a decentralized control button, and wherein the decentralized control button also comprises the indicator device.

11. The modular mounting press system as claimed in claim 1,
wherein the at least one external mounting press comprises a sliding closure and wherein the sliding closure comprises a sensor device for detecting a position of the sliding closure and communicates the position to the central control device.

12. The modular mounting press system as claimed in claim 4,
further comprising a central suction device including a suction manifold for connecting the basic module mounting press and the at least one external mounting press to the central suction device.

13. The modular mounting press system as claimed in claim 1, wherein the central input device is configured to program the at least one external mounting press by a user.

14. The modular mounting press system as claimed in claim 1, wherein the at least one external mounting press itself does not include a complete process control unit and receives all control parameters from the basic module.

15. The modular mounting press system as claimed in claim 7, wherein the first external mounting press and he second external mounting press themselves do not include a complete process control unit and receive all control parameters from the basic module.

16. The modular mounting press system as claimed in claim 4, wherein the basic module mounting press comprises a sliding closure and wherein the sliding closure comprises a sensor device for detecting a position of the sliding closure and communicates the position to the central control device.

17. A modular mounting press system for hot mounting samples comprising:
a basic module for controlling at least one external mounting press; and
a first external mounting press separate from and controllable by the basic module, and having a first mounting cylinder for receiving samples, the first mounting cylinder having a cylinder opening at an upper end that can be closed by an upper piston;
the basic module comprising:
a central input device for entering control data for the at least one external mounting press;
a central control device in communication with the central input device and for generating and outputting control parameters and for controlling the at least one external mounting press;
a central power supply port for connecting the modular mounting press system to an external power supply; and
a power distributor for providing the electrical power to the at least one external mounting press, the power distributor in communication with the central control device; and
wherein the at least one external mounting press comprises a sliding closure and wherein the sliding closure comprises a sensor device for detecting a position of the sliding closure and communicates the position to the central control device.

* * * * *